(12) United States Patent
Dhoopar et al.

(10) Patent No.: US 9,710,525 B2
(45) Date of Patent: Jul. 18, 2017

(54) ADAPTIVE LEARNING OF EFFECTIVE TROUBLESHOOTING PATTERNS

(71) Applicant: BMC Software, Inc., Houston, TX (US)

(72) Inventors: Rakesh Dhoopar, San Jose, CA (US); Joseph Scarpelli, Half Moon Bay, CA (US); Guriqbal Singh, Newark, CA (US); Sameer Pokarna, Pune (IN); Abhijit Sharma, Pune (IN); Nilesh Phadke, Pune (IN); Neeran Karnik, Pune (IN)

(73) Assignee: BMC Software, Inc., Houston, TX (US)

( * ) Notice: Subject to any disclaimer, the term of this patent is extended or adjusted under 35 U.S.C. 154(b) by 508 days.

(21) Appl. No.: 14/067,824

(22) Filed: Oct. 30, 2013

(65) Prior Publication Data
US 2014/0280068 A1 Sep. 18, 2014

Related U.S. Application Data

(60) Provisional application No. 61/798,913, filed on Mar. 15, 2013.

(51) Int. Cl.
| | |
|---|---|
| *G06F 17/30* | (2006.01) |
| *G06F 11/07* | (2006.01) |
| *G06Q 10/06* | (2012.01) |
| *G06Q 30/00* | (2012.01) |

(52) U.S. Cl.
CPC .... *G06F 17/30554* (2013.01); *G06F 11/0706* (2013.01); *G06F 11/079* (2013.01); *G06Q 10/06* (2013.01); *G06Q 30/016* (2013.01)

(58) Field of Classification Search
CPC .................................................. G06F 17/30221
USPC .................................................. 707/711, 706
See application file for complete search history.

(56) References Cited

U.S. PATENT DOCUMENTS

| | | | | |
|---|---|---|---|---|
| 5,157,668 A | * | 10/1992 | Buenzli, Jr. ........ | G01R 31/2846 714/26 |
| 7,490,073 B1 | * | 2/2009 | Qureshi ................ | G06N 5/048 706/50 |
| 7,840,557 B1 | * | 11/2010 | Smith ................ | G06F 12/0875 707/722 |
| 8,229,977 B1 | * | 7/2012 | Anderson ........... | G06F 17/3089 707/805 |

(Continued)

*Primary Examiner* — Baoquoc N To
(74) *Attorney, Agent, or Firm* — Brake Hughes Bellermann LLP

(57) ABSTRACT

The system may include a troubleshooting activity recorder configured to record troubleshooting sessions. Each troubleshooting session may include a sequence of queries and query results. The troubleshooting activity recorder may include a query transformer configured to transform the queries and the query results into transformed queries and transformed query results before recording the troubleshooting sessions. The troubleshooting activity recorder may be configured to record the transformed queries and the transformed query results as troubleshooting session information in a troubleshooting activity database. The system may include a troubleshooting pattern learning unit including a graph builder configured to generate a troubleshooting pattern graph having query nodes and links between the query nodes based on the troubleshooting session information.

18 Claims, 18 Drawing Sheets

(56) References Cited

U.S. PATENT DOCUMENTS

| | | | | |
|---|---|---|---|---|
| 2005/0050096 | A1* | 3/2005 | Gomes | G06Q 10/06 |
| 2005/0172170 | A1* | 8/2005 | Thieret | G06F 11/0748 |
| | | | | 714/37 |
| 2006/0074597 | A1* | 4/2006 | Raphael | G06F 11/0793 |
| | | | | 702/183 |
| 2007/0243509 | A1* | 10/2007 | Stiebel | G06Q 30/02 |
| | | | | 434/236 |
| 2007/0283400 | A1* | 12/2007 | Lee | H04N 7/10 |
| | | | | 725/107 |
| 2007/0283401 | A1* | 12/2007 | Lee | H04H 20/12 |
| | | | | 725/107 |
| 2007/0292833 | A1* | 12/2007 | Brodie | G06F 17/3061 |
| | | | | 434/350 |
| 2010/0281012 | A1* | 11/2010 | Imig | G06F 17/30864 |
| | | | | 707/708 |
| 2011/0265065 | A1* | 10/2011 | Kuboki | G06F 11/008 |
| | | | | 717/131 |
| 2013/0097151 | A1* | 4/2013 | Cushing | G06F 17/30592 |
| | | | | 707/722 |
| 2014/0006862 | A1* | 1/2014 | Jain | G06F 11/0736 |
| | | | | 714/26 |

* cited by examiner

ADAPTIVE LEARNING OF EFFECTIVE TROUBLESHOOTING PATTERNS

RELATED APPLICATION

This application claims priority to and the benefit of U.S. Provisional Patent Application Ser. No. 61/798,913, filed on Mar. 15, 2013, entitled, "ADAPTIVE LEARNING OF EFFECTIVE TROUBLESHOOTING PATTERNS," which is incorporated herein by reference in its entirety.

TECHNICAL FIELD

This description relates to the processing of information, and more specifically to the adaptive learning and guidance to troubleshooting.

BACKGROUND

Typically, troubleshooters follow an iterative troubleshooting process or pattern. This may be a sequence of steps in a troubleshooting session, where a troubleshooter may execute troubleshooting queries in a system, examine the results, and then drill down further by executing additional queries till the root cause of the problem is identified. In practice, troubleshooting within a relatively large computing environment is not a simple sequence of steps. For example, the user might navigate through many different nodes in a manner that can be backwards, forwards, sideways, or randomly, as opposed to a single direction. As a result, it may become difficult to keep track of the various searches performed, the order in which they were performed, and to track each search result in the context of the query.

In general, troubleshooting may require deep domain expertise in each of the solution components of the system. Further, troubleshooting is highly collaborative, and largely a manual process. This often increases the turnaround time for resolving issues e.g. as measured by support ticket closure duration.

For example, experienced troubleshooters, over time, develop a mental library of troubleshooting patterns mapped to frequently observed issues or data, and they use this tribal knowledge to achieve faster issue resolution. However, this is largely dependent on the experience of the troubleshooter and it takes time for a novice troubleshooter to come up to speed. Further, some conventional methods may lack context sensitive troubleshooting guidance. For example, even if these patterns are documented in certain documents or articles (e.g., KB articles), they are often difficult to use and maintain, and are not available in the context of a specific troubleshooting step. In addition, as systems change, the issues observed also change and hence existing troubleshooting patterns may lose their relevance. Troubleshooters will again need time to learn the new patterns and exploit them.

SUMMARY

The system may include at least one processor, and a non-transitory computer-readable medium storing instructions, when executed by the at least one processor, are configured to implement a troubleshooting activity recorder configured to record troubleshooting sessions. Each troubleshooting session may include a sequence of queries and query results. The troubleshooting activity recorder may include a query transformer configured to transform the queries and the query results into transformed queries and transformed query results before recording the troubleshooting sessions. The transformed queries may include a templatized version of the queries. The transformed query results may include normalized query results. The troubleshooting activity recorder may be configured to record the transformed queries and the transformed query results as troubleshooting session information in a troubleshooting activity database. The system may include a troubleshooting pattern learning unit including a graph builder configured to generate a troubleshooting pattern graph having query nodes and links between the query nodes based on the troubleshooting session information.

For each query, the query transformer may be configured to record a time window of a query and replace values of the query with placeholder parameters. For each query result, the query transformer may be configured to remove instance-specific data of a query result and create one or more searchable terms corresponding to the query result. The query transformer may be configured to associate metadata information with one or more of the transformed query results.

For a troubleshooting session, the graph builder may be configured to process a sequence of transformed queries from the troubleshooting session information including a first transformed query and a second transformed query. For example, the graph builder may be configured to create a first query node corresponding to the first transformed query and a second query node corresponding to the second transformed query if the first transformed query and the second transformed query do not match existing query nodes in the troubleshooting pattern graph. Then, the graph builder may be configured to create a link between the first query node and the second query node, where the link is annotated with a transformed query result of the first transformed query.

The troubleshooting pattern graph may include an arrangement of the query nodes, where the query nodes is annotated with the transformed queries, and the links is annotated with the transformed query results of at least some of the queries and the frequencies in which the links were traversed.

The troubleshooting activity recorder may be configured to record secondary troubleshooting session information for additional troubleshooting sessions, and the graph builder may be configured to update the troubleshooting pattern graph based on the secondary troubleshooting session information.

The system may include a query suggestor configured to recommend at least one proposed query within a live troubleshooting session based on a context of the current troubleshooting session and the troubleshooting pattern graph, where the context of the current troubleshooting session includes a current query and a query result corresponding to current query.

The query suggestor may be configured to compare the current query to the query nodes to determine whether a query node matches the current query, and the query suggestor may be configured to determine which of the query nodes to recommend as the at least one proposed query based on similarity of the query result of the current query to query results associated with the links stemming from the matched query node, distances from the matched query node to an end query node via the links, and/or frequencies in which the links were traversed.

The query suggestor may be configured to calculate scores for at least some of the query nodes based on a weighting of the similarity, the distances, and the frequencies, and recommend at least one query node as the at least one proposed query based on the calculated scores. The query suggestor may be configured to rank the query nodes based on the calculated scores.

The embodiments may provide a computer-implemented method for providing a guided troubleshooting session. The method may include receiving a context of a live troubleshooting session, where the context may include a current query and a query result corresponding to the current query. The method may include obtaining a troubleshooting pattern graph, and recommending a next query in the live troubleshooting session based on the current query, the query results, and the troubleshooting pattern graph.

The troubleshooting pattern graph may include an arrangement of query nodes and links between the query nodes. The query nodes may be annotated with transformed queries for previously recorded troubleshooting sessions. The links may be annotated with transformed query results and the frequencies in which the links were traversed for previously recorded troubleshooting sessions.

The recommending may include calculating scores for at least a portion of the query nodes based on an analysis of the troubleshooting pattern graph, and determining at least one query node as the next query to be recommended in the live troubleshooting session based on the calculated scores. The recommending may further include determining whether a query node matches the current query, determining which of the query nodes to recommend as the next query based on similarity of the query result of the current query to the transformed query results associated with links stemming from the matched query node, distances from the matched query node to an end query node via the links, and frequencies in which the links were traversed, and calculating scores for query nodes based on a weighting of the similarity, the distances, and the frequencies.

The embodiments may include a non-transitory computer-readable medium storing instructions, when executed by at least one processor, are configured to transform queries and query results of previous troubleshooting sessions into transformed queries and transformed query results. The transformed queries may include a templatized version of the queries, and the transformed query results may include normalized results of the query results. The instructions may include instructions to record the transformed queries and the transformed query results as troubleshooting session information in a troubleshooting activity database, generate a troubleshooting pattern graph having query nodes and links between the query nodes based on the troubleshooting session information, and recommend a next query in a live troubleshooting session based a current context of the live troubleshooting session and the troubleshooting pattern graph.

The instructions to generate the troubleshooting pattern graph may include instructions to process, for each previous troubleshooting session, a sequence of transformed queries from the troubleshooting activity information including a first transformed query and a second transformed query. The instructions may create a first query node corresponding to the first transformed query and a second query node corresponding to the second transformed query if the first transformed query and the second transformed query do not match existing query nodes in the troubleshooting pattern graph, and create a link between the first query node and the second query node, the link being annotated with a transformed query result of the first transformed query.

The instructions may include instructions to record secondary troubleshooting session information for additional troubleshooting sessions, and update the troubleshooting pattern graph based on the secondary troubleshooting session information.

The instructions to recommend the next query may include instructions to calculate scores for at least a portion of the query nodes based on an analysis of the troubleshooting pattern graph, and determine at least one query node as the next query to be recommended in the live troubleshooting session based on the calculated scores.

The instructions to recommend the next query may include instructions to determine whether a query node matches the current query, determine which of the query nodes to recommend as the next query based on similarity of the query result of the current query to query results associated with links stemming from the matched query node, distances from the matched query node to an end query node via the links, and frequencies in which the links were traversed, and calculate the scores for the portion of query nodes based on a weighting of the similarity, the distances, and the frequencies.

The details of one or more implementations are set forth in the accompanying drawings and the description below. Other features will be apparent from the description and drawings, and from the claims.

DETAILED DESCRIPTION

Figure 1:
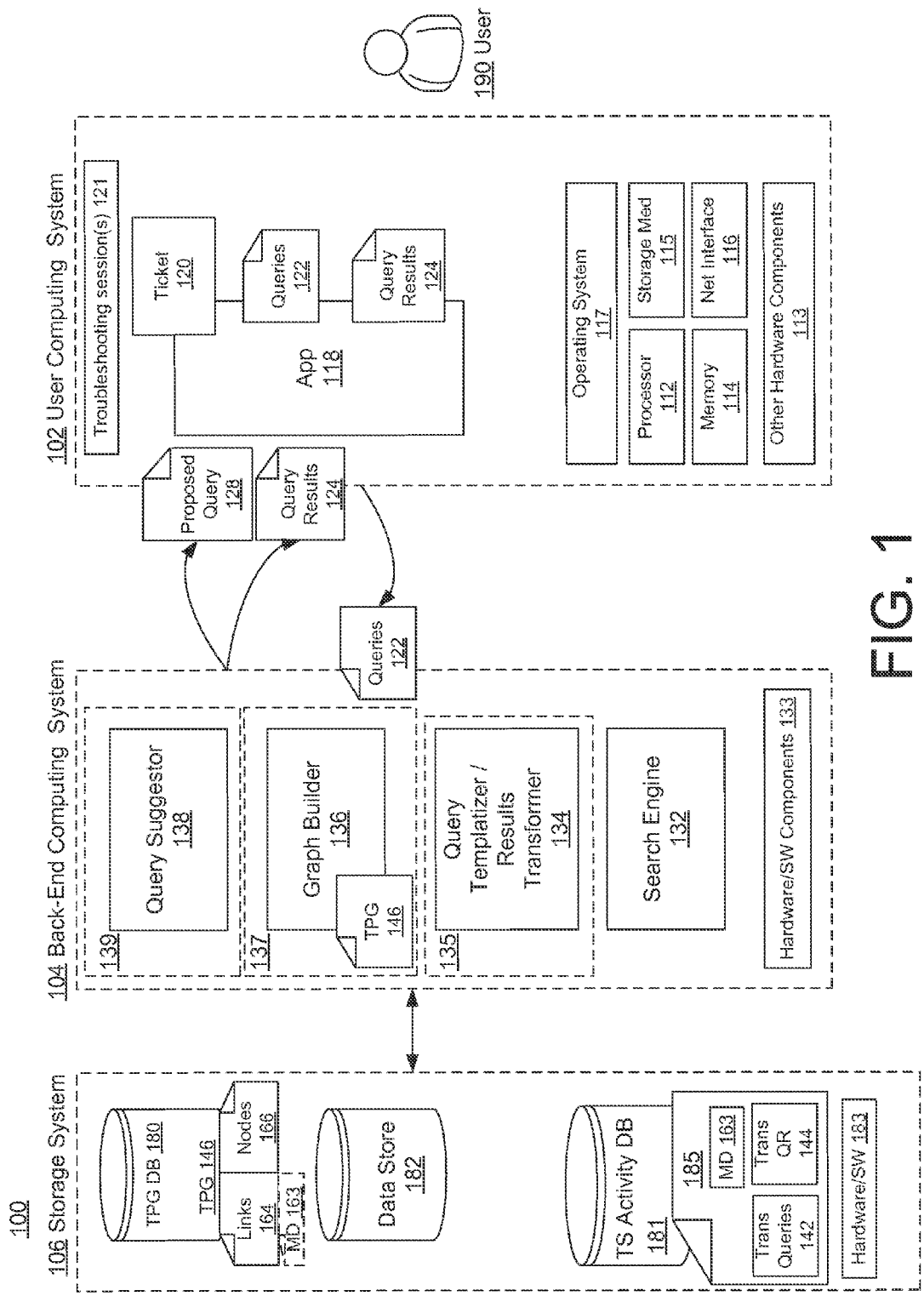
FIG. 1 is a block diagram of a system according to an embodiment.

The embodiments provide a system and method that dynamically learns effective troubleshooting patterns using collected troubleshooting session information from previous troubleshooting sessions, and applies the troubleshooting patterns in order to guide the troubleshooter on the next query within a current (live) troubleshooting session. In some examples, the system may be constructed for troubleshooting in complex, multi-tier solutions by searching through various data sources such as product logs, for example.

In one embodiment, the system may dynamically generate a troubleshooting pattern graph (and periodically update it) based on previously recorded troubleshooting sessions. For example, a troubleshooting session may include a series of queries and query results, as well as an outcome indicating whether the root cause of the problem that prompted the troubleshooting session has been resolved or not. For each troubleshooting session, before recording the troubleshooting activity (e.g., the queries and query results), the system may transform (e.g., templatize) these queries and query results such that queries and the query results are generalized and subsequently searchable. More generally, the transformed queries and query results ensure that patterns of usage are discovered by eliminating instance-specific data, generalizing query phrases or terms, and representing query results in a more general fashion such as a bag of words representation. Further, the transformed queries and query results enable the system to locate similar queries in the troubleshooting pattern graph in the context of a live troubleshooting session, and to compare the transformed query results with that of the current query of the live session in order to suggest one or more next queries to be performed.

Furthermore, as the system records additional troubleshooting sessions in the manner described above, the system may periodically update the troubleshooting pattern graph such that the system is adaptive to changing problems and best practices. In other words, the system may continuously evolve the captured knowledge, and therefore may keep the troubleshooting pattern graph in sync with changing problems and best practices. In addition, the system may capture the tribal knowledge of experienced troubleshooters without requiring them to explicitly document their best practices. In this manner, the novice troubleshoot may exploit the knowledge learned from previous sessions in an automated and simplified fashion.

In addition, the system may include a guided troubleshooting process that recommends the most relevant and effective next step of a live troubleshooting session based on the troubleshooting pattern graph. For example, the system may guide subsequent troubleshooting sessions with recommendation for queries based on the troubleshooting pattern graph. In one example, the system may provide a clickable set of query steps within the current context of the troubleshooting process, and recommend the most relevant and effective next step. As further explained below, in some examples, the system may compute the relevance of each potential next query based on its previous use along the current path, and effectiveness based on the steps to resolution in the troubleshooting pattern graph. These and other features will be further explained with reference to the figures.

FIG. 1 is a block diagram of an example embodiment of a system 100 in accordance with the disclosed subject matter. First, the disclosure will provide an overview of the components of the system 100. Second, the disclosure will explain the three main processes of the system 100—1) recording troubleshooting sessions (including the transformation of queries and query results), 2) learning troubleshooting patterns (including the generation of a troubleshooting pattern graph), and 3) performing a guided troubleshooting process for a current troubleshooting session based on the troubleshooting pattern graph.

Overview of Components

In various embodiments, the system 100 may include a user computing system or device 102, a back-end computing system or device 104, one or more storage computing devices or systems 106. In various embodiments, one or more of the devices 102, 104 or 106 may be combined or integrated.

In various embodiments, the user device 102 may include a computing device, such as, for example, a laptop, desktop, workstation, personal digital assistant, smartphone, tablet, and other appropriate computers, etc. or a virtual machine or virtual computing device thereof. In various embodiments, the user device 102 may be used by a user 190 in order to troubleshoot one or more systems in the context of one or more troubleshooting sessions 121. In various embodiments, the user device 102 may include a processor 112 configured to execute one or more machine executable instructions or pieces of software, firmware, or a combination thereof. The user device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the user device 102 may include a storage medium 115 configured to store data in a semi-permanent or substantially permanent form. In various embodiments, the storage medium 115 may be included by the memory 114.

In various embodiments, the user device 102 may include one or more network interfaces 116 configured to allow the user device 102 to be part of and communicate via a communications network. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the user device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In various embodiments, the user device 102 may include an operating system (OS) 117 configured to provide one or more services to an application 118 and manage or act as an intermediary between the application 118 and the various hardware components (e.g., the processor 112, a network interface 116, etc.) of the user device 102. In such an embodiment, the user device 102 may include one or more native applications, which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 112.

In various embodiments, the user 190 may make use of the application 118 to search for a solution to or attempt to resolve a ticket 120 in the context of a trouble shooting session 121. Generally, each troubleshooting session 121 may include the details of a session in which the user is attempting to resolve the ticket 120. The troubleshooting session 121 may be associated with a ticket identifier, a ticket description providing a description of the problem, and a query sequence providing the sequence of queries 122 submitted in the context of the troubleshooting session 121.

Using the application 118, the user 190 may perform or submit one or more queries 122 to a search engine 132 of the back-end computing system 104. In one such embodiment, one or more of these queries 122 may result in one or more query results 124. A query 122 may be a specific troubleshooting search query that is executed as part of a sequence of queries executed in a troubleshooting session 121. A query result 124 may be in the form of matching results (e.g., unstructured data) from the data store 182 that stores information across a networking environment. For example, the query result 124 may include unstructured data from the data store 182 that meets the constraint of the corresponding query 122.

In various embodiments, the storage system(s) or computing device(s) 106 may include a computing device, such as, for example, a laptop, desktop, workstation, blade server, server, and other appropriate computers, etc. or a virtual machine or virtual computing device thereof. In various embodiments, the storage system 106 may include various hardware or software components 183 that are similar or analogous to the hardware and software components described in relation to the user computing device 102 (e.g., processor, memory, operating system, etc.).

In various embodiments, the storage system 106 may include a data store 182. The data store 182 may represent one or more storage databases which may be any type of indexed data store that stores information regarding a network environment. In some examples, the data store 182 may capture information across the entire environment (e.g., network, storage, compute, application, etc.). As such, the information captured in the data store 182 may relate to a broad network environment that may include one or multiple computing systems. In some examples, the data store 182 may include log entries that may detail or summarize an event that occurred within a network environment (e.g., network, storage, compute, application, etc.), configuration file snapshots, and/or event data from any component within the network environment. Also, the data store 182 may capture any other types of information commonly captured throughout the network environment.

In some embodiments, the storage system 106 may include one or more troubleshooting pattern graphs (TPG) 146. In various embodiments, each troubleshooting pattern graph 146 may be associated with a particular type or categorization of a ticket 120, a portion of a network or computing system, a type of user 190, a period of time, or other categorization scheme. Generally, a troubleshooting pattern graph 146 may be a directed graph which captures historical troubleshooting pattern data for resolved tickets 120, and may be used for recommending the most relevant and effective next troubleshooting step to execute relative to the current context of a current (live) troubleshooting session 121.

As further described later in the disclosure, each troubleshooting pattern graph 146 may include one or more representations of queries nodes 166, and one or more links 164 that associate two or more query nodes 166 with each other. In some examples, one or more of the query nodes 166 may be associated with transformed queries, and one or more of the links 164 may be associated with transformed query results and the frequencies in which the links 164 were traversed for previous troubleshooting sessions 121, as further explained below. Further, these query nodes 166 and links 164 may be associated with various pieces of metadata information 163.

The storage system 106 may also include a troubleshooting (TS) activity database 181 that stores troubleshooting (TS) session information 185. The TS session information 185 may be referred to as completed/recorded troubleshooting sessions, or troubleshooting sessions that have undergone the transformation operations discussed herein. The TS session information 185 may include the relevant information associated with each troubleshooting session 121, which may include transformed queries 142 and transformed query results 144. Further, the TS session information 185 may include the metadata information 163. This metadata information 163 may be incorporated into the troubleshooting pattern graph 146 as discussed above. The metadata information 163 may include key information such as the number of query results associated with each query, and faceted information that may provide grouping/categorization of the query results based on what log/entry in the data store 182 they pertain to, for example. As further described later, the metadata information 163 may be used in a similarity search to compute similarity scores. The transformed queries 142 and the transformed query results 144 are described later in the disclosure.

The back-end computing device 104 may include a computing device, such as, for example, a laptop, desktop, workstation, blade server, server, and other appropriate computers, etc. or a virtual machine or virtual computing device thereof. In various embodiments, the back-end device 104 may include various hardware or software components 133 that are similar or analogous to the hardware and software components described in relation to the user computing device 102 (e.g., processor, memory, operating system, etc.).

In the illustrated embodiment, the back-end computing device 104 may include a search engine 132 configured to perform a search of the data store 182 in the context processing the queries 122. For example, the search engine 132 may receive one or more queries 122 submitted by the user during a troubleshooting session 121. The search engine 132 may use these queries 122 to search the data store 182 and generate one or more query results 124. In such an embodiment, the queries 122 may be received from the user device 102 and the query results 124 may be returned or transmitted to the user device 102.

Also, the back-end computing device 104 may include a troubleshooting (TS) activity recorder 135 configured to record the queries 122 and the query results 124 as transformed queries 142 and transformed query results 144 in the TS activity database 181. For example, the TS activity recorder 135 may include a query transformer 134 that is configured to transform the queries 122 and the query results 124 associated with a particular troubleshooting session 121 in a manner that produces the transformed queries 142 and the transformed query results 144.

The query transformer 134 may transform a query 122 to a templatized version that is a more general query than the one submitted by the user 190. For example, the query transformer 134 may be configured to convert the raw data of the query 122 submitted by the user 190 to a structured format such as a canonical query Abstract Syntax Tree (AST). In some examples, the query transformer 134 may be configured to record the time window of the query 122, replace host and other confidence interval (CI) values of the query 122 with placeholder parameters, and replace timestamp value(s) of the query 122 with a time window with placeholder parameters. In one example, the transformed query 142 may include placeholder parameters and the recorded time window in a formal structure.

In some examples, the query transformer 134 may transform a query result 124 to a templatized version that is a more general query result than the one returned to the user 190. For example, the query transformer 134 may transform the query result 124 (before recording it to the TS activity database 181) to a format that is compatible with a TS pattern learning unit 137 and/or a TS process guider 139. In one example, the query transformer 134 may be configured to remove instance-specific data of the query result 124, and normalize the content of the query result 124 to a format that makes it easier to compare with other query results. In this context, the normalized content of the query result 124 may include one or more terms that are subsequently searchable. This transformation of the query results 124 may be based on a number of different similarity analysis techniques. In one example, the normalization may be based on a bag-of-words technique that produces an unordered collection of words, which may disregard grammar and even word order. Further, the transformed query result 144 may be associated with a timestamp (e.g., time when corresponding query was executed and yielded this result).

The TS activity recorder 135 may store the transformed queries 142 and the transformed query results 144 in association with their corresponding troubleshooting session 121. In other words, within each troubleshooting session 121, the transformed queries 142 are stored in the sequence as they occurred, as well as the transformed query results 144 corresponding to the transformed queries 142.

The back-end computing device 104 may also include a troubleshooting (TS) pattern learning unit 137 configured to learn troubleshooting patterns based on the TS session information 185 stored in the TS activity database 181. The TS pattern learning unit 137 may include a graph builder 136 configure to generate (and update) the troubleshooting pattern graph 146. In some examples, the graph builder 136 may receive the TS session information 185 (including the transformed queries 142 and the transformed query results 144 and/or the metadata information 163), and use these inputs to build or manipulate a troubleshooting pattern graph 146. This process is further explained with reference to FIGS. 3A-3L.

Also, the back-end computing device 104 may include a troubleshooting (TS) process guider 139 configured to guide the user 190 during a current (live) troubleshooting session 121. For example, the TS process guider 139 may include a query suggestor 138 configured to recommend a next query (e.g., the proposed query 128) in the current troubleshooting session 121 based on the troubleshooting pattern graph 146 and the current context of the live troubleshooting session 121. In some examples, the current context may include the current query that has been submitted by the user, and the corresponding query results. In some examples, the query suggestor 138 may be configured to recommend a next query in the live troubleshooting session based on the troubleshooting pattern graph 146 and the current query 122 and/or query result 124. In particular, the query suggestor 138 may be configured to locate a query node 166 in the troubleshooting pattern graph 146 that is similar to the current query 166, and then determine a next step based on a similarity analysis involves the links 164 extending from the located query node 166. These features are further explained with reference to FIG. 4.

Generally, the system 100 may include three main processes—1) recording troubleshooting session activity, 2) learning troubleshooting patterns, and 3) performing a guided troubleshooting process for a current troubleshooting session, as further described below.

Recording Troubleshooting Session Activity

The TS activity recorder 135 may be configured to record the TS session information 185 for one or more troubleshooting sessions 121 in the TS activity database 181. For example, within a particular troubleshooting session 121, the search engine 132 may receive a query 122, search the data store 182 according to the query 122, and obtain a query result 124 in response to the query 122. Within the context of the same troubleshooting session 121, the search engine 132 may receive another query 122, search the data store 182, and obtain a query result 124 in response to this subsequent query 122. The search engine 132 may continue to receive subsequent queries 122 and provide query results 124 until the ticket 120 is marked resolved. As such, each troubleshooting session 121 may include a series of queries 122 and query results 124 associated with a particular ticket 120.

As explained above, before recording the TS session information 185, the query transformer 134 may be configured to transform the queries 122 and the query results 124 into the transformed queries 142 and transformed query results 144. This process is further explained with reference to FIG. 2.

Figure 2:
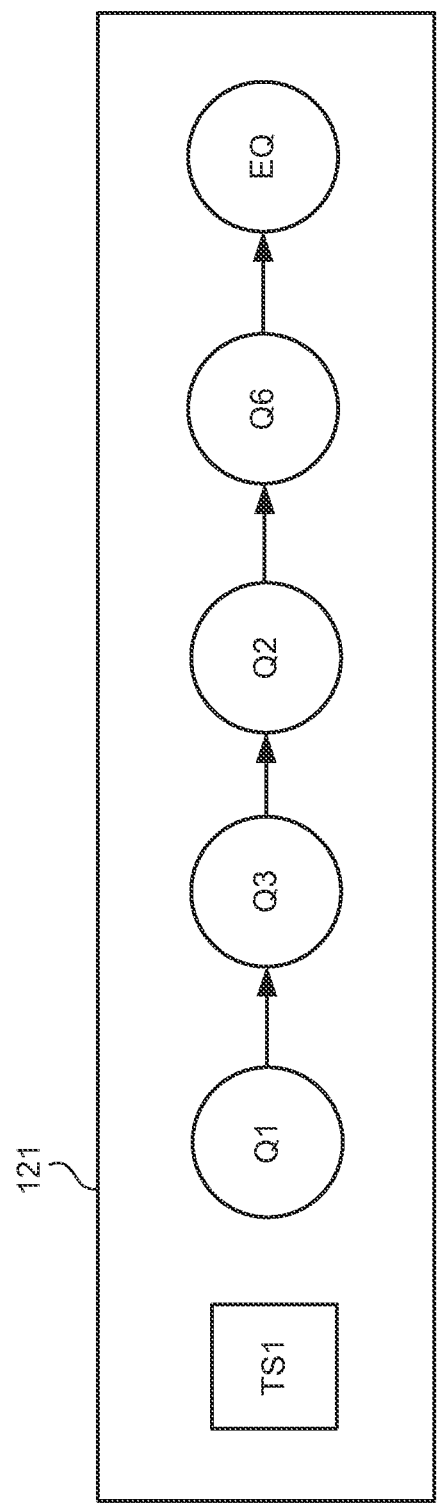
FIG. 2 illustrates an example of a troubleshooting session that is recorded in a troubleshooting (TS) activity database of the system of FIG. 1 according to an embodiment.

FIG. 2 illustrates an example of a troubleshooting session 121 that is recorded in the TS activity database 181 according to an embodiment. In the context of FIG. 2 (as well as FIG. 3), each query Q (e.g., Q1 to Q6) may be considered the transformed query 142 as explained above. As shown in FIG. 2, the troubleshooting session 121 depicts a sequence of queries such as query Q1 to query Q3 to query Q2 to query Q6 to query EQ. These are the queries taken by the user 190 in the context of performing the troubleshooting session 121. As shown in FIG. 2, the last query associated with the troubleshooting session 121 may be an end query (EQ) that represents the end of the troubleshooting session 121.

With respect to queries Q, the query transformer 134 may transform a query 122 to a templatized version that is a more general query than the one submitted by the user 190. For example, the query transformer 134 may be configured to convert the raw data of the query 122 submitted by the user 190 to a structured format such as the canonical query AST. In some examples, the query transformer 134 may be configured to record the time window of the query 122, replace host and other CI values of the query 122 with placeholder parameters, and replace timestamp values of the query 122 with a time window with placeholder parameters. In one example, the transformed query 142 may include placeholder parameters and the recorded time window in a formal structure.

In other words, the query transformer 134 may be configured to generalize the queries 122 into a format suitable for applying a query matching process during the phase of generating the troubleshooting pattern graph 146 and/or the guided troubleshoot process. Below are a few examples of transforming the content of the queries 122.

Example 1

A query instance of a query may be found in the data store 182 in a time range 30 seconds before and after a specific time (e.g., time Range=t−30 to t+30). Another query instance may be found in the data store 182 in a time range 1 minute before and after a specific time (e.g., time Range=t−60 to t+60). In this case, the query transformer 134 may convert both these queries to the form Time Range=t+x to t−x.

Example 2

Consider a query of the form app=clm and timestamp>1000 and timestamp<2000 and host=10.20.30.40. In one example, the query transformer 134 may replace the host value with a placeholder parameter (or in general CI's), and replace the timestamp values with a placeholder parameter. As such, the query transformer 134 may convert this query to app=clm and timestamp>now−time window and timestamp<now+time window and host=?. Therefore, the query transformer 134 may be configured to templatize the raw query (before being recorded) in order to transfer it to a more comparable format that is compatible with a query matching process and guided troubleshooting process.

The follow is an example of a submitted query 122: app={clm} and timestamp>10000 and timestamp<20000 and host={10.20.30.40}. In one example, the query transformer 134 may be configured to convert the raw query to a canonical query AST (Abstract Syntax Tree). Further, the query transformer 134 may be configured to record the time window, replace the host and other CI values (regular expression based) with placeholder parameters, and replace timestamp values with placeholder parameters and time window. As a result, the query transformer 134 may be configured to create the following transformed query 142: app={clm} and timestamp>?+{time window} and timestamp<?−{time window} and host=?.

With respect to query results, the query transformer 134 may transform a query result 124 to a templatized version that is a more general query result than the one returned to the user 190. For example, the query transformer 134 may transform the query result 124 (before recording it to the TS activity database 181) to a format that is compatible with a TS pattern learning unit 137 and/or a TS process guider 139. As a result, the transformed query results 144 may include one or more searchable terms.

In particular, the query transformer 134 may be configured to remove instance-specific data of the query result 124. For example, the query transformer 134 may be configured to remove timestamps, universal unique identifiers (UUIDs), machine, and internet protocol (IP) references etc. based on rules/regular expressions etc. Generally, the query transformer 134 may be configured to remove any markers in data that are not essential to the general troubleshooting process.

Also, the query transformer 134 may be configured to normalize the content of the query result 124 to a format that makes it easier to compare with other query results. In one example, the normalization may be based on a bag-of-words technique that produces an unordered collection of words, which may disregard grammar and even word order. Further, the transformed query result 144 may be associated with a timestamp (e.g., time when corresponding query was executed and yielded this result). However, the query transformer 134 may include metadata information 163 within the transformed query results 144 such as the number of results in each search, and faceted information (e.g., grouping/categorization of results based on what log/entry source they pertain to), etc. The metadata information 163 may be used in the similarity search to compute the similarity score, as further explained below.

Therefore, the transformed query results 144 may be the query results that were applied to the transformation function which removes the timestamp specific information from the entries of the data store 182 and converts the remaining text into searchable terms that are able to be used in a similarity analysis (e.g., the bag-of-words representation), as well as the relevant metadata information 163.

As a result, the TS activity recorder 135 may record all the transformed queries 142 and the transformed query results 144 and the sequence in which they are performed within each completed troubleshooting session 121. Successful troubleshooting sessions may be referred to as completed troubleshooting sessions. For completed troubleshooting sessions, the last query in the sequence is the end query (EQ), as shown in FIG. 2. Otherwise, the troubleshooting session 121 may be identified as incomplete. As further explained below, only the completed troubleshooting sessions 121 are used to build the troubleshooting pattern graph 146.

Learning Troubleshooting Patterns

As explained above, the TS pattern learning unit 137 may include the graph builder 136 that may generate the troubleshooting pattern graph 146 based on the TS session information 185 stored within the TS activity database 181, and then subsequently update the troubleshooting pattern graph 146 as more troubleshooting sessions 121 are recorded in the TS activity database 181. In one example, the graph builder 136 may be configured to periodically update the troubleshooting pattern graph 146, e.g., after a certain period of time or after a certain number of troubleshooting sessions 121 are recorded. In one embodiment, the troubleshooting pattern graph 146 may be used to suggest one or more next queries (e.g., the proposed query 128) in a current (live) troubleshooting session 121. The proposed query 128 may include information from the transformed query 142 corresponding to the query node 166 that has been selected as the best next step to take in the live troubleshooting session 121, as further described with reference to FIGS. 3 and 4. Also, the proposed query 128 may represent multiple queries to be considered in the next troubleshooting step of the live troubleshooting session 121, where these recommended queries may be scored and ranked, as further described later in the disclosure.

In one example, the graph builder 136 may be configured to receive the TS session information 185 over a configured duration from the current time to take into account currency of the troubleshooting pattern graph 146. This feature accounts for changing troubleshooting patterns as tickets 120 get solved over time in the underlying products. As such, over time, the graph builder 136 may update (prune) the troubleshooting pattern graph 146 to account for the changing trends.

In one example, the graph builder 136 may employ a query matching function that receives a given input query and attempts to locate and match a corresponding query node 166 in the troubleshooting pattern graph 146. For example, the graph builder 136 may be configured to compare the input query with the already-stored query nodes 166 in the troubleshooting pattern graph 146 to identify a query node Q in the troubleshooting pattern graph 146 that substantially matches the transformed query 142. In one example, the query matching function of the graph builder 136 is based on the query AST comparison, as example of which is illustrated below.

Query AST comparison: app={clm} and timestamp>?+{time window} and timestamp<?-{time window} and host=?

FIGS. 3A-3L illustrates example operations of the graph builder 136 for generating the troubleshooting pattern graph 146 corresponding to completed troubleshooting sessions 121 according to an embodiment.

Figure 3A:
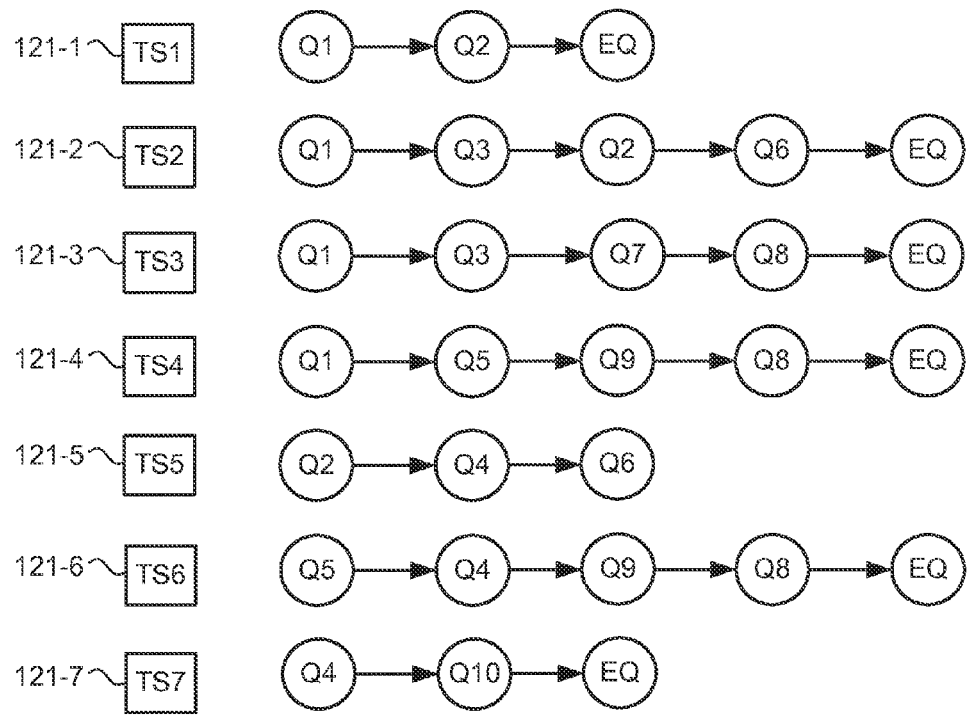
FIG. 3A illustrates a set of troubleshooting sessions according to an embodiment.

FIG. 3A illustrates a set of troubleshooting sessions 121 according to an embodiment. For example, FIG. 3A illustrates a plurality of troubleshooting sessions 121 including a first troubleshooting session 121-1, a second troubleshooting session 121-2, a third troubleshooting session 121-3, a fourth troubleshooting session 121-4, a fifth troubleshooting session 121-5, a sixth troubleshooting session 121-6, and a seventh troubleshooting session 121-7. Each of the troubleshooting sessions 121 may include a sequence of queries Q. In the context of FIG. 3A (as well as FIGS. 3B-3L), each query Q may be the transformed query 142. Accordingly, each query Q may be associated with a query result QR (e.g., the transformed query result 144). Further, in these figures, similar queries are identified by the same identifier. For example, the query Q1 of the first troubleshooting session 121-1 may be the same type of query as the query Q1 of the second troubleshooting session 121-2 according to the matching function described above.

In one embodiment, each of the troubleshooting sessions 121 in FIG. 3A may be completed troubleshooting sessions with the exception of the fifth troubleshooting session 121-5. For example, each of the completed troubleshooting sessions 121 may be associated with an end query (EQ). Because the fifth troubleshooting session 121-5 is not associated with the end query (EQ), the fifth troubleshooting session 121-5 may be an incomplete troubleshooting session and not stored in the TS activity database 181. In one embodiment, the graph builder 136 may be configured to process each of the queries Q in order to construct or build the troubleshooting pattern graph 146, as explained with reference to FIGS. 3B-3L.

Figure 3B:
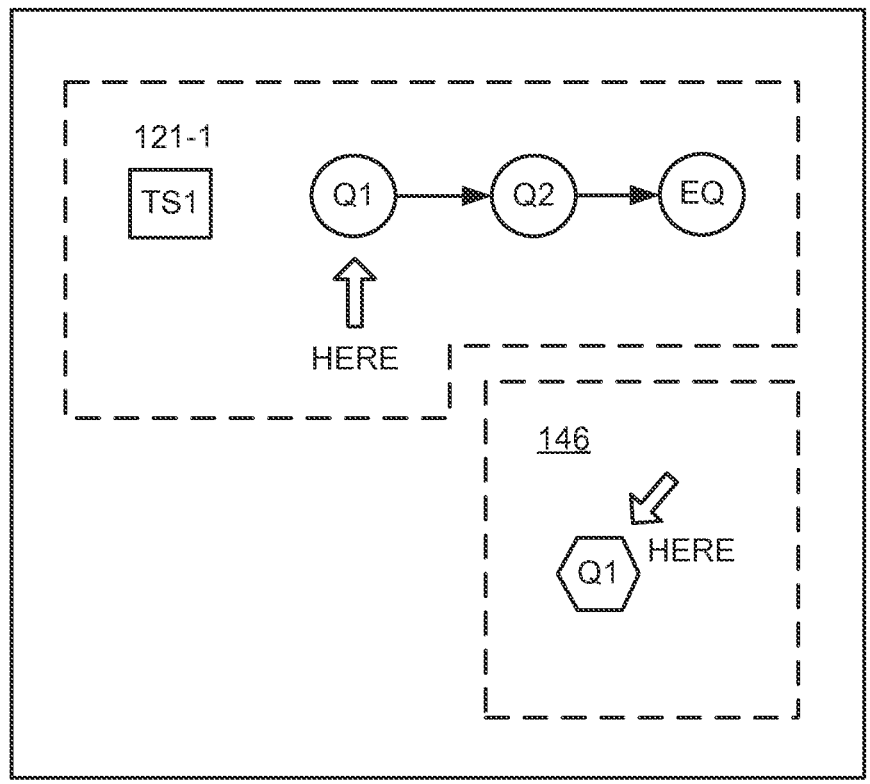
FIG. 3B illustrates a processing of a query of a first troubleshooting session for constructing the troubleshooting pattern graph according to an embodiment.

FIG. 3B illustrates a processing of the query Q1 of the first troubleshooting session 121-1 for constructing the troubleshooting pattern graph 146 according to an embodiment. As explained above, the graph builder 136 may analyze the TS session information 185 (that includes the transformed queries 142 and the transformed query results 144 in the sequence as they occur) in order to construct the troubleshooting pattern graph 146. As indicated above, each of the queries Q may be considered a transformed query 142.

In the example of FIG. 3B, the graph builder 136 may start the process by considering the query Q1 in the first troubleshooting session 121-1. In this context, the graph builder 136 may search the troubleshooting pattern graph 146 to locate existing query nodes 166 in the troubleshooting pattern graph 146 that substantially match the query Q1 according to the matching function described above. At this point, because the troubleshooting pattern graph 146 does not contain any existing query nodes 166, the graph builder 136 determines that the query Q1 is not found, and thereby adds the query Q1 as a query node Q1 to the troubleshooting pattern graph 146. The query node Q1 (e.g., query node 166) may be considered a vertex representing the query Q1. The query node Q1 may include the content of the query Q1 such as the templatized version (e.g., "connection refused" and Time Range "now-x to now+x") (e.g., canonical query AST). Also, the graph builder 136 positions a pointer to the query node Q1.

Figure 3C:
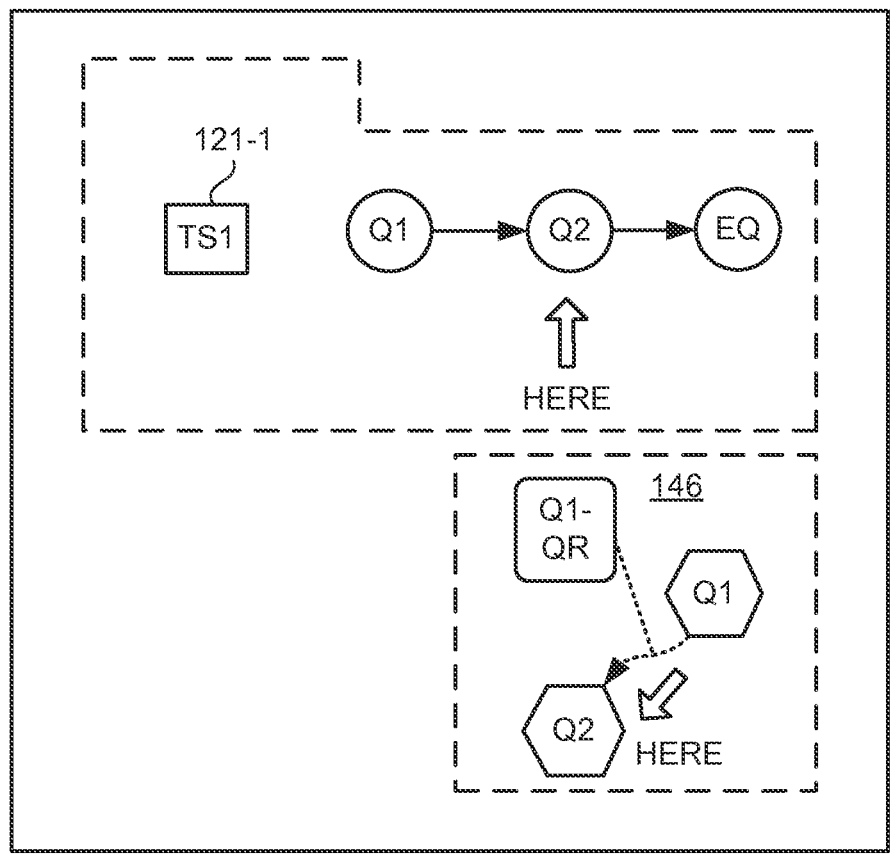
FIG. 3C illustrates a processing of another query of the first troubleshooting session for constructing the troubleshooting pattern graph according to an embodiment.

FIG. 3C illustrates a processing of the query Q2 of the first troubleshooting session 121-1 for constructing the troubleshooting pattern graph 146 according to an embodiment.

After the query Q1 is processed, the graph builder 136 proceeds to the next query in the sequence—the query Q2. In this example, the graph builder 136 searches the troubleshooting pattern graph 146 to locate existing query nodes Q in the troubleshooting pattern graph 146 that substantially match the query Q2 using the matching function. In particular, the graph builder 136 may consider all outgoing edges in the troubleshooting pattern graph 146 from the query node Q having the current pointer (e.g., query node Q1). In this case, because a similar query node does not exist, the graph builder 136 may determine that the query Q2 is not found, and thereby creates another query node (query node Q2) associated with the query Q2 in the troubleshooting pattern graph 146. Again, the query node Q2 may include the templatized version of the query Q2 (e.g., "server ? down" and time range "now-y to now+y").

In addition the graph builder 136 creates a link (Q1-Q2) from the query node Q1 to the query node Q2, and associates the transformed query results Q1-QR (e.g., the transformed query results associated with the query Q1) with the link Q1-Q2. As such, the link (Q1-Q2) is annotated with the normalized results of the query Q1 (e.g., the bag-of-words representing the query results). The link (Q1-Q2) may be considered the path from the query node Q1 to the query node Q2. Then, the graph builder 136 may set the current pointer to the query node Q2 in the troubleshooting pattern graph 146.

Figure 3D:
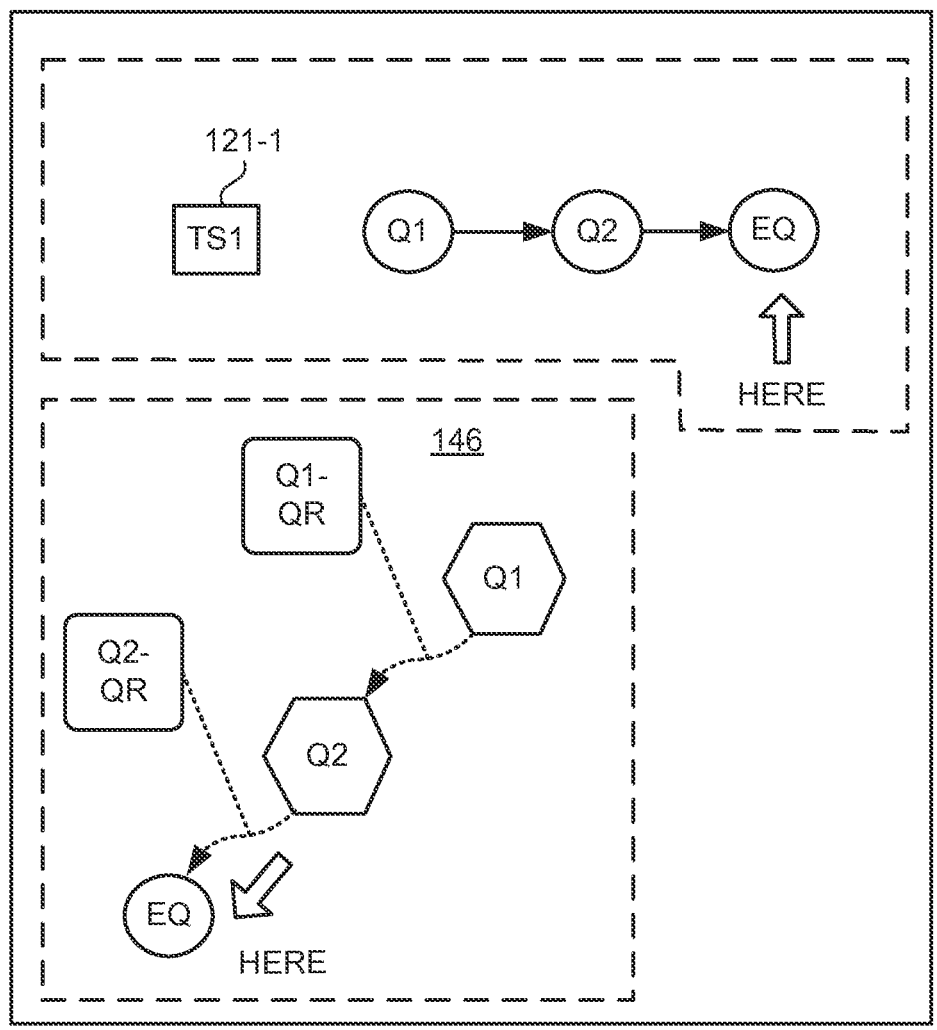
FIG. 3D illustrates a processing of another query of the first troubleshooting session for constructing the troubleshooting pattern graph according to an embodiment.

FIG. 3D illustrates a processing of a next query of the first troubleshooting session 121-1 for constructing the troubleshooting pattern graph 146 according to an embodiment. In this example, the next query of the first troubleshooting session 121-1 is the end query EQ. The graph builder 136 may process the end query EQ in the same manner as described above. For example, the graph builder 136 may consider all the outgoing edges in the troubleshooting pattern graph 146 from the query Q2 to locate existing query nodes in the troubleshooting pattern graph 146 that substantially match the end query EQ according to the matching function. In this case, because the end query EQ does not currently exist, the graph builder 136 may determine that the end query EQ is not located, and may create the query node EQ. The graph builder 136 may add a link (Q2-EQ) from the query node Q2 to the query node EQ, and associate the link (Q2–EQ) with the transformed query results of the query Q2 (e.g., Q2–QR).

Figure 3E:
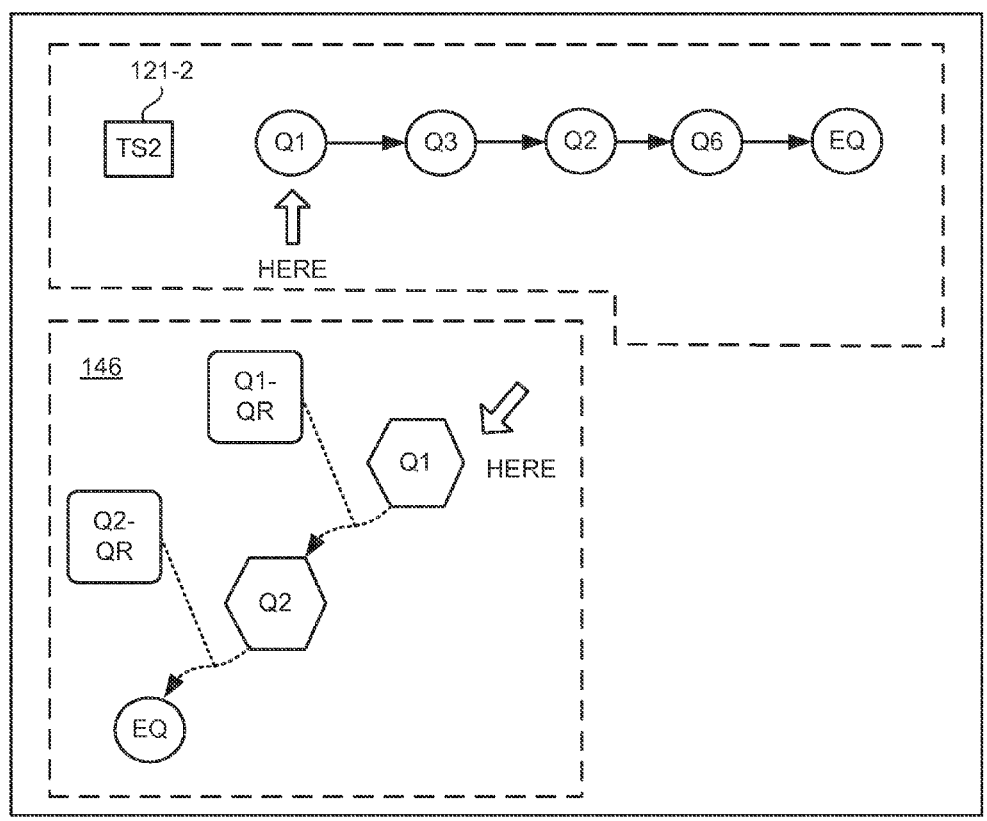
FIG. 3E illustrates a processing of a query of a second troubleshooting session for constructing the troubleshooting pattern graph according to an embodiment.

FIG. 3E illustrates a processing of a query of the second troubleshooting session 121-2 for constructing the troubleshooting pattern graph 146 according to an embodiment. Similar to the process of the first troubleshooting session 121-1, the graph builder 136 may process the second troubleshooting session 121-2 by considering the query Q1 in the second troubleshooting session 121-2. In this context, the graph builder 136 may search the troubleshooting pattern graph 146 to locate existing query nodes in the troubleshooting pattern graph 146 that substantially match the query Q1 of the second troubleshooting session 121-2.

In particular, the graph builder 136 may consider all outgoing edges in the troubleshooting pattern graph 146 from the query node Q1. In this case, because a similar query node exists (e.g., query node Q1), the graph builder 136 may determine that the query Q1 of the second troubleshooting session 121-2 is found, and sets the current pointer in the troubleshooting pattern graph 146 to the query Q1.

Figure 3F:
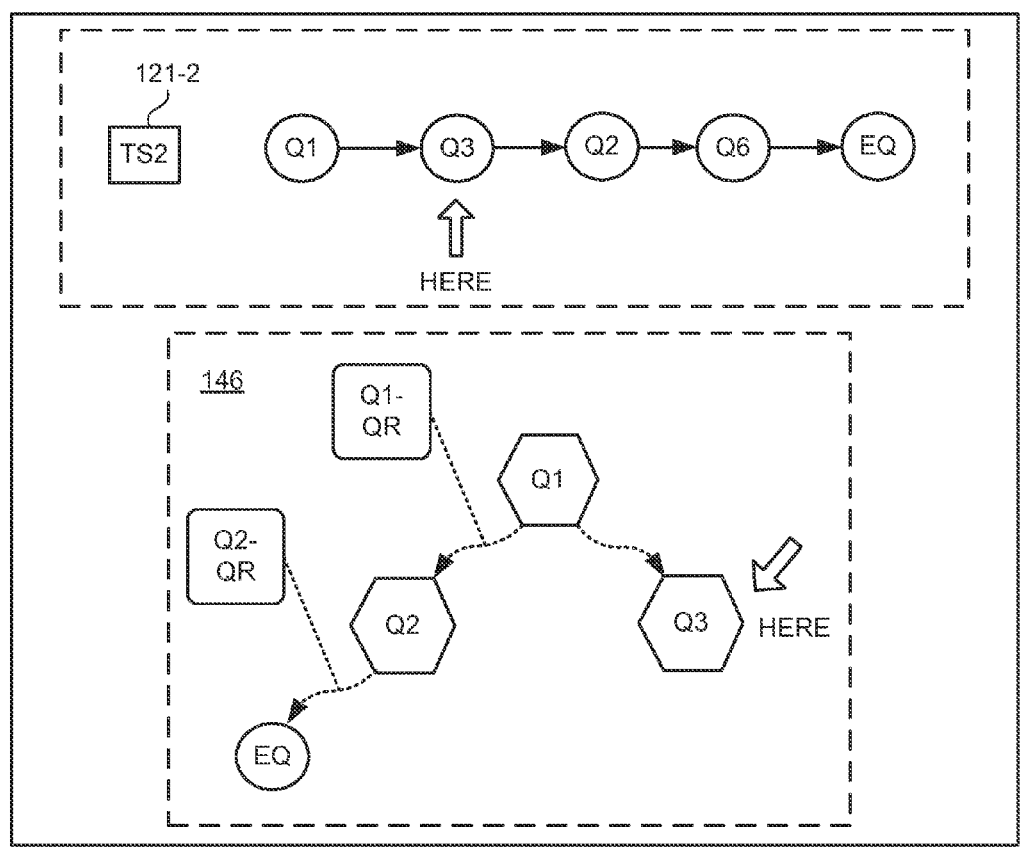
FIG. 3F illustrates a processing of another query of the second troubleshooting session for constructing the troubleshooting pattern graph according to an embodiment.

FIG. 3F illustrates a processing of a subsequent query of the second troubleshooting session 121-2 for constructing the troubleshooting pattern graph 146 according to an embodiment. Again, the graph builder 136 may process the second troubleshooting session 121-2 by next considering the subsequent query (query Q3) in the second troubleshooting session 121-2. In this context, the graph builder 136 may search the troubleshooting pattern graph 146 to locate existing query nodes in the troubleshooting pattern graph 146 that substantially match the query Q3 of the second troubleshooting session 121-2. In particular, the graph builder 136 may examine the outgoing edges (e.g., Q1–Q2) of the query node of the current pointer (e.g., query Q1).

In this case, because a similar query does not exist, the graph builder 136 may determine that the query Q3 is not found, and thereby creates the query node Q3. Also, the graph builder 136 creates a link (Q1–Q3) from the query node Q1 to the query node Q2, and associates the transformed query result (Q1–QR) of the query Q1 associated with the second troubleshooting session 121-2. Then, the graph builder 136 sets the current pointer in the troubleshooting pattern graph 146 to the query node Q3.

Figure 3G:
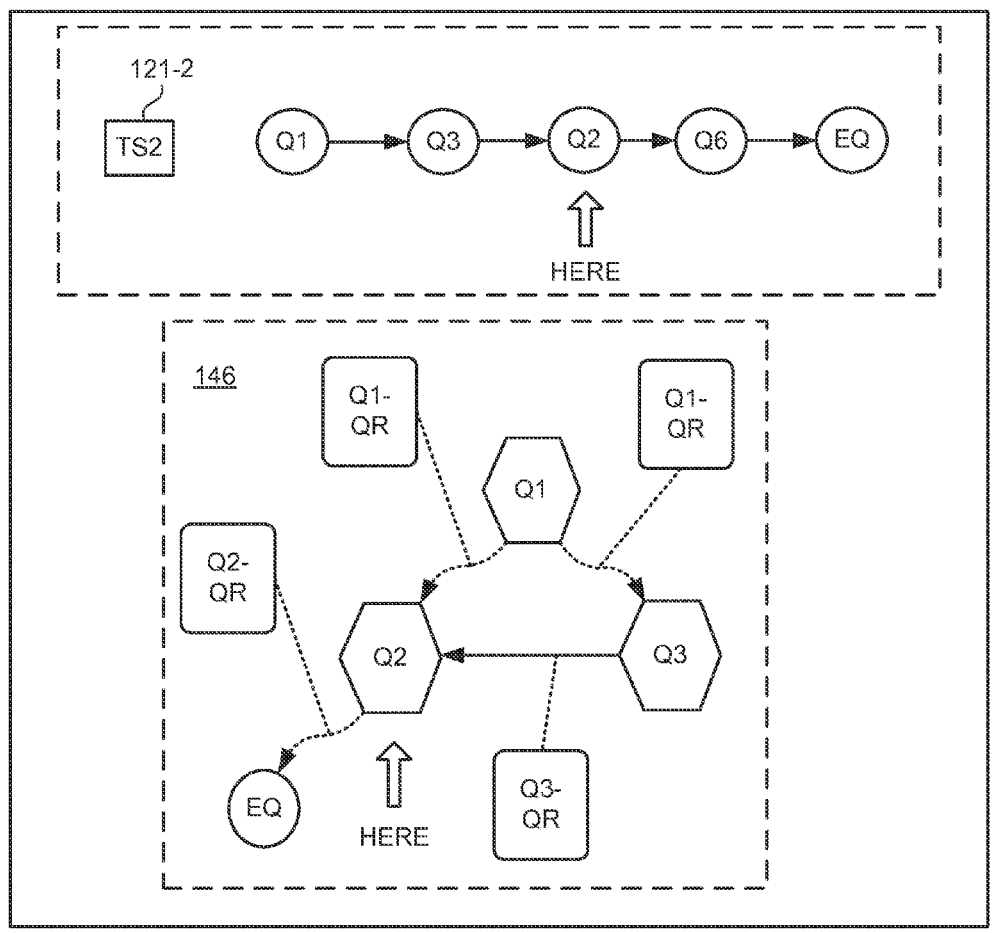
FIG. 3G illustrates a processing of another query of the second troubleshooting session for constructing the troubleshooting pattern graph according to an embodiment.

FIG. 3G illustrates a processing of a subsequent query (Q2) of the second troubleshooting session 121-2 for constructing the troubleshooting pattern graph 146 according to an embodiment.

In this example, the graph builder 136 searches the troubleshooting pattern graph 146 to locate existing query nodes in the troubleshooting pattern graph 146 that substantially match the query Q2. In particular, the graph builder 136 may consider all outgoing edges (e.g., none exist) in the troubleshooting pattern graph 146 from the query Q3. In this case, because a similar query node does not exist from the outgoing edges of the query Q3, the graph builder 136 may determine that the query Q2 is not found along with this path. Then, the graph builder 136 may search the entire troubleshooting pattern graph 146 to determine if a similar query node exists, and, in this case, the graph builder 136 determines that the query node Q2 already exists. In this case, the graph builder 136 does not create a separate query node, but rather creates a link (Q3–Q2) from the query node Q3 to the query node Q2. Then, the graph builder 136 may associate the transformed query result (Q3–QR) of the query Q3 with the link (Q3–Q2), and set the current pointer in the troubleshooting pattern graph 146 to the query node Q2.

Figure 3H:
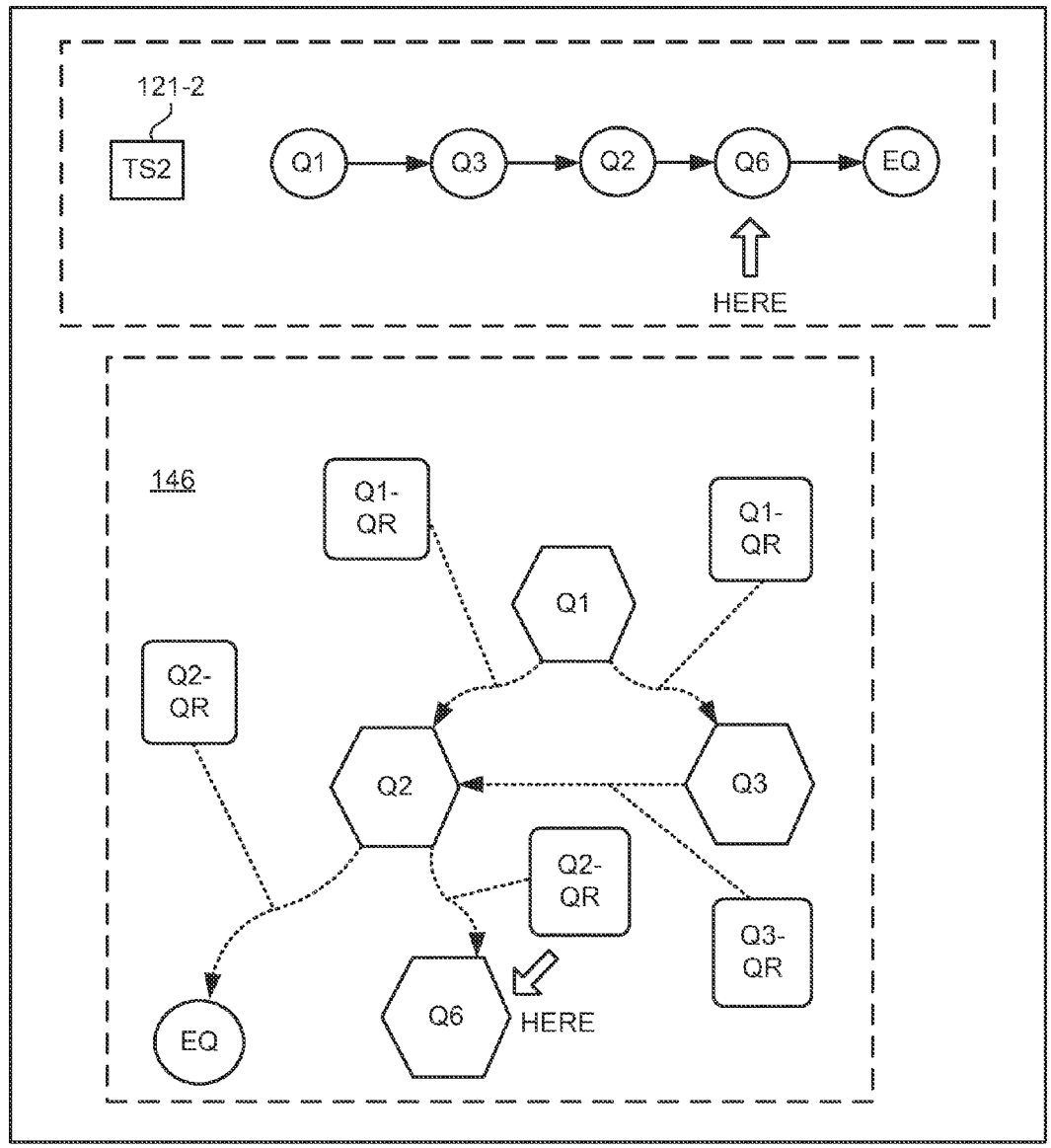
FIG. 3H illustrates a processing of another query of the second troubleshooting session for constructing the troubleshooting pattern graph according to an embodiment.

FIG. 3H illustrates a processing of a subsequent query (Q6) of the second troubleshooting session 121-2 for constructing the troubleshooting pattern graph 146 according to an embodiment.

In this example, the graph builder 136 searches the troubleshooting pattern graph 146 to locate existing query nodes in the troubleshooting pattern graph 146 that substantially match the query Q6. In particular, the graph builder 136 may consider all outgoing edges in the troubleshooting pattern graph 146 from the query node Q2 (e.g., where the current pointer is located). In this case, because a similar query node does not exist from the outgoing edges (none exist) of the query Q2, the graph builder 136 may determine that the query Q2 is not found along with this path. Then, the graph builder 136 may search the entire troubleshooting pattern graph 146 to determine if a similar query node exists, and, in this case, the graph builder 136 determines that the query node Q6 does not exist.

According, the graph builder 136 may create the query node Q6, and create a link (Q2–Q6). Then, the graph builder 136 may associate the transformed query result (Q2–QR) of the query Q2 with the link (Q2–Q6), and set the current pointer in the troubleshooting pattern graph 146 to the query node Q6.

Figure 3I:
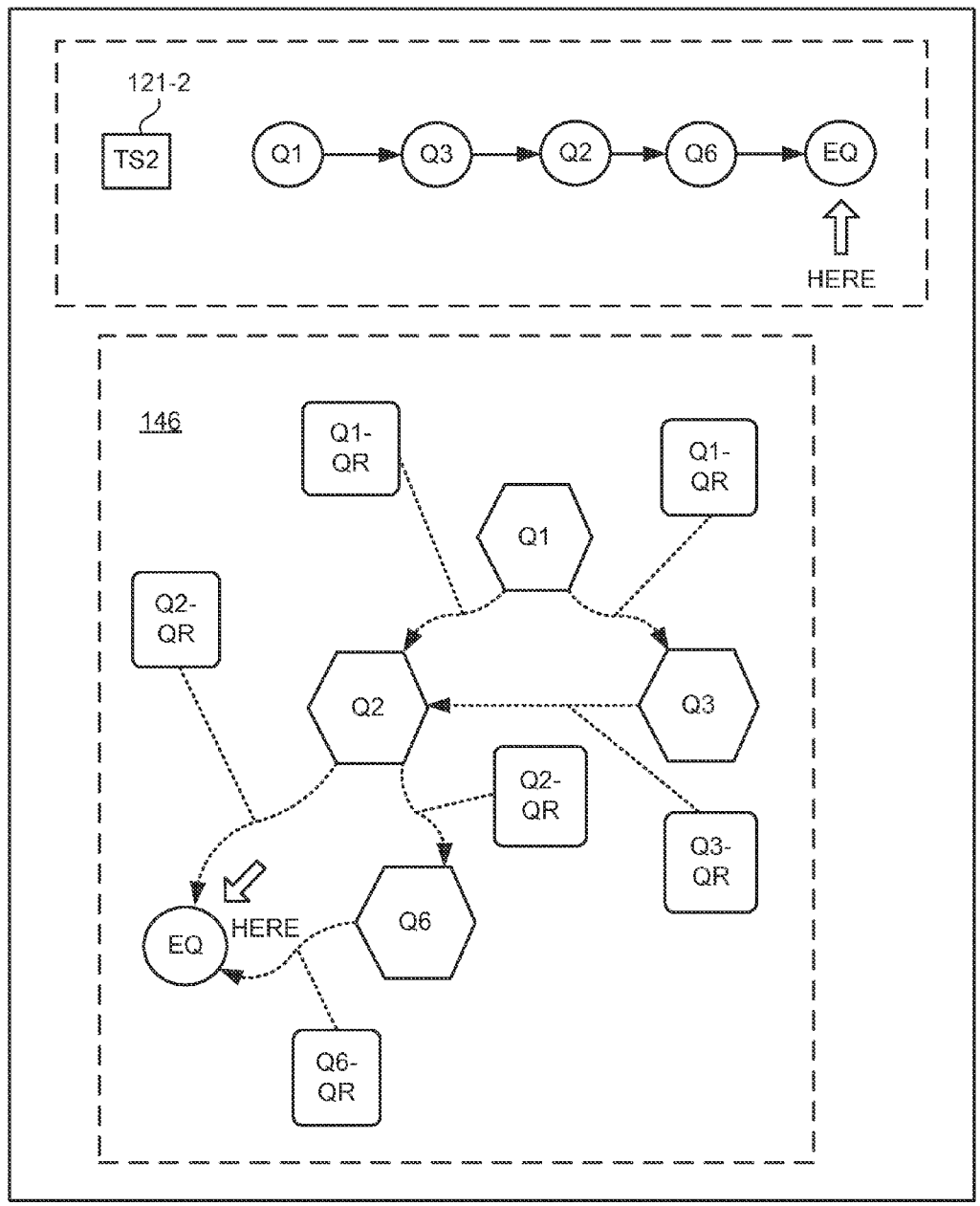
FIG. 3I illustrates a processing of another query of the second troubleshooting session for constructing the troubleshooting pattern graph according to an embodiment.

FIG. 3I illustrates a processing of a subsequent query (EQ) of the second troubleshooting session 121-2 for constructing the troubleshooting pattern graph 146 according to an embodiment.

In this example, the next query of the second troubleshooting session 121-2 is the end query EQ. As such, the graph builder 136 may process the end query EQ in the same manner as described above. For example, the graph builder 136 may consider all the outgoing edges (Q6–EQ) in the troubleshooting pattern graph 146 from the query node Q6 to locate existing query nodes in the troubleshooting pattern graph 146 that substantially match the end query EQ. Because the end query EQ currently does not exist along the outgoing edges, the graph builder 136 may create a link (Q6–EQ) from the query node Q6 to the end query EQ. Then, the graph builder 136 may associate the transformed query result (Q6–QR) of the query Q6 with the link (Q6–EQ), and set the current pointer in the troubleshooting pattern graph 146 to the query node EQ.

Figure 3J:
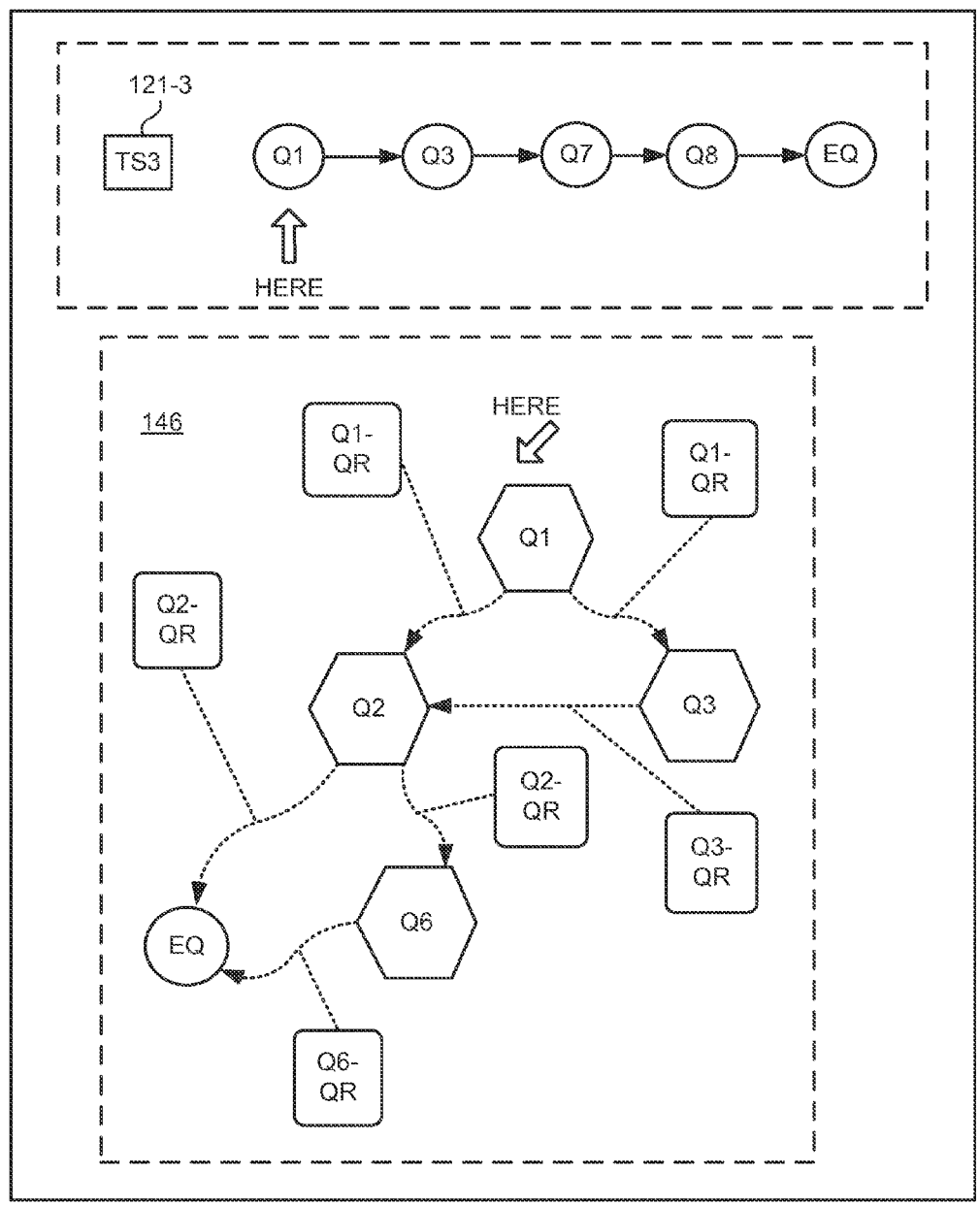
FIG. 3J illustrates a processing of a query of a third troubleshooting session for constructing the troubleshooting pattern graph according to an embodiment.

FIG. 3J illustrates a processing of a query (Q1) of the third troubleshooting session 121-3 for constructing the troubleshooting pattern graph 146 according to an embodiment.

In this example, the graph builder 136 may start processing the third troubleshooting session 121-3 by considering the first query in the sequence—query Q1. For example, the graph builder 136 searches the troubleshooting pattern graph 146 to locate existing query nodes in the troubleshooting pattern graph 146 that substantially match the query Q1. For instance, because this is a new troubleshooting session, the graph builder 136 may search the entire troubleshooting pattern graph 146 (as opposed to specific outgoing edges). Because the query node Q1 already exists in the troubleshooting pattern graph 146, the graph builder 136 sets the current pointer in the troubleshooting pattern graph 146 to the query node Q1.

Figure 3K:
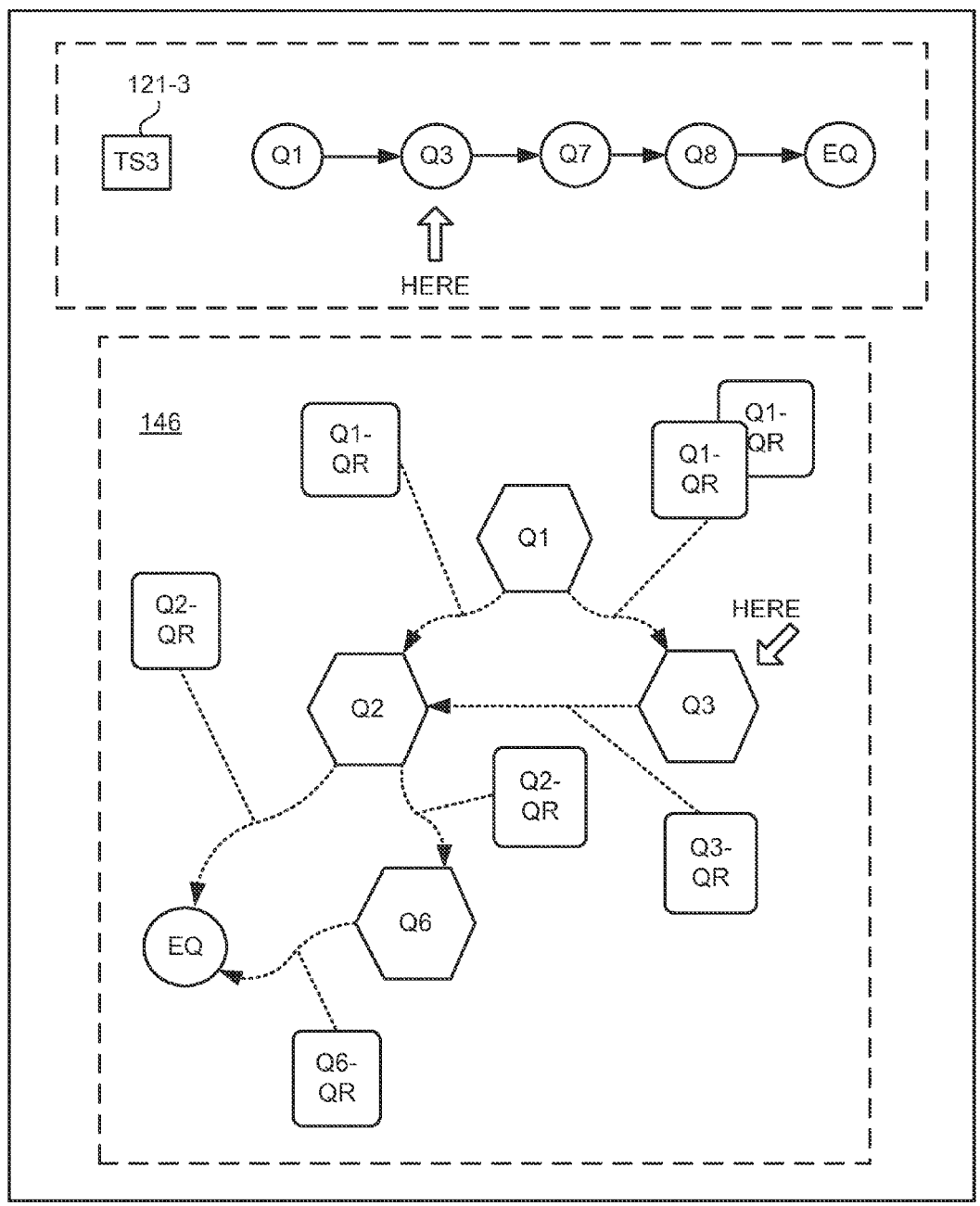
FIG. 3K illustrates a processing of another query of the third troubleshooting session for constructing the troubleshooting pattern graph according to an embodiment.

FIG. 3K illustrates a processing of a subsequent query (Q3) of the third troubleshooting session 121-3 for constructing the troubleshooting pattern graph 146 according to an embodiment.

In this example, the graph builder 136 searches the troubleshooting pattern graph 146 to locate existing query nodes in the troubleshooting pattern graph 146 that substantially match the query Q3. In particular, the graph builder 136 may consider all outgoing edges (Q1-Q2, Q1-Q3) in the troubleshooting pattern graph 146 from the query node that substantially match the query Q3. In this case, the graph builder 136 locates the query node Q3 within the troubleshooting pattern graph 146, and locates a previously existing link (Q1-Q3). Then, the graph builder 136 may additionally associated the transformed query result (Q1-QR) of the query Q1 of the third troubleshooting session 121-3 with the previously existing link (Q1-Q3). Therefore, the link (Q1-Q3) may include a collection of transformed query results (first Q1-QR, second Q1-QR). Then, the graph builder 136 may set the current pointer in the troubleshooting pattern graph 146 to the query node Q3.

The graph builder 136 may repeat the same operations for the rest of the queries Q associated with the third troubleshooting session 121-3, as well as the queries Q associated with fourth troubleshooting session 121-4 to the seventh troubleshooting session 121-7 of FIG. 3A.

Figure 3L:
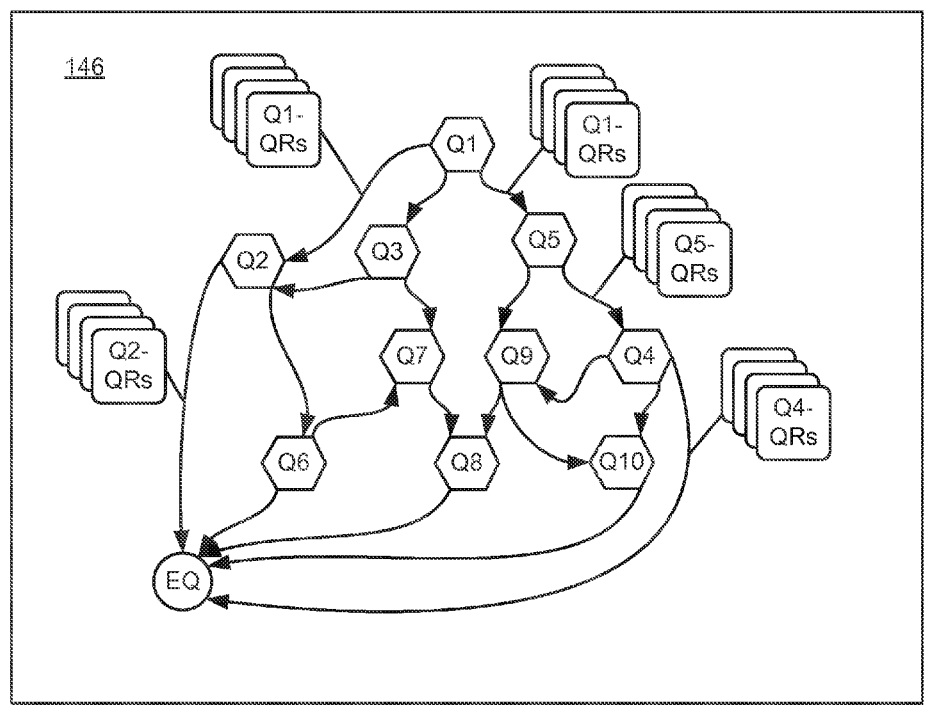
FIG. 3L illustrates a troubleshooting pattern graph according to an embodiment.

FIG. 3L illustrates a troubleshooting pattern graph 146 according to an embodiment. For example, upon completion of processing the set of troubleshooting sessions 121 in the manner described above, the graph builder 136 may obtain the troubleshooting pattern graph 146 providing an arrangement of the query nodes Q1-Q10 and various links between them. Further, some of these links may be associated with a collection of transformed query results, e.g., the collection of transformed query results Q2-QRs on the link (Q2-EQ), the collection of transformed query results Q1-QRs on the link (Q1-Q2), the collection of transformed query results Q1-QRs on the link (Q1-Q5), the collection of transformed query results Q5-QRs on the link (Q5-Q4), and the collection of transformed query results Q4-QRs on the link (Q4-Q10). Further, the troubleshooting pattern graph 146 may include illustrate other types of useful information such as the frequency in which troubleshooters have followed the links, as well as the distances between the query nodes and the end query EQ.

Also, as explained above, the graph builder 136 may periodically update the troubleshooting pattern graph 146 by processing additional troubleshooting sessions 121. For instance, the graph builder 136 may receive a new batch of troubleshooting sessions 121, and then update the troubleshooting pattern graph 146 in the same manner described above.

Guided Troubleshooting Process

Referring to FIG. 1, in the context of a live troubleshooting session 121, the query suggestor 138 may recommend one or more queries (e.g., proposed query 128 to be considered for execution) in the troubleshooting process based on the troubleshooting pattern graph 146. In one example, the query suggestor 138 may rank as per relevant the possible next troubleshooting step(s) as captured in the troubleshooting pattern graph 146 based on the current query 122 and corresponding query result 124 and the troubleshooting pattern graph 146, as further explained with reference to FIG. 4.

Generally, the query suggestor 138 may calculate scores for the query nodes 166 based on the information contained in the troubleshooting pattern graph 146, and then determine one or more query nodes 166 as recommendation(s) for the next steps in the live troubleshooting session 121. The scores may represent a degree of relevancy of the query nodes 166 for providing a recommendation (e.g., the higher the score, the more likely it will be recommended as the next proposed query). As further discussed with reference to FIG. 4, the query suggestor 138 may make the recommendation based on a number of parameters to determine which query node 166 to recommend to the troubleshooter. For example, the query suggestor 138 may based the recommendation on the similarity of query results (e.g., the similarity of the query result of the current query to a query result associated with a link), the distance to the end query node via the link, and the frequency in which that link was previously traversed by previous troubleshooters. Then, the query suggestor 138 may compute the score for the query node 166 by weighting the similarity, the distance, and the frequency. Further, the query nodes 166 to be considered for the next step may be ranked based on their calculated scores.

Figure 4:
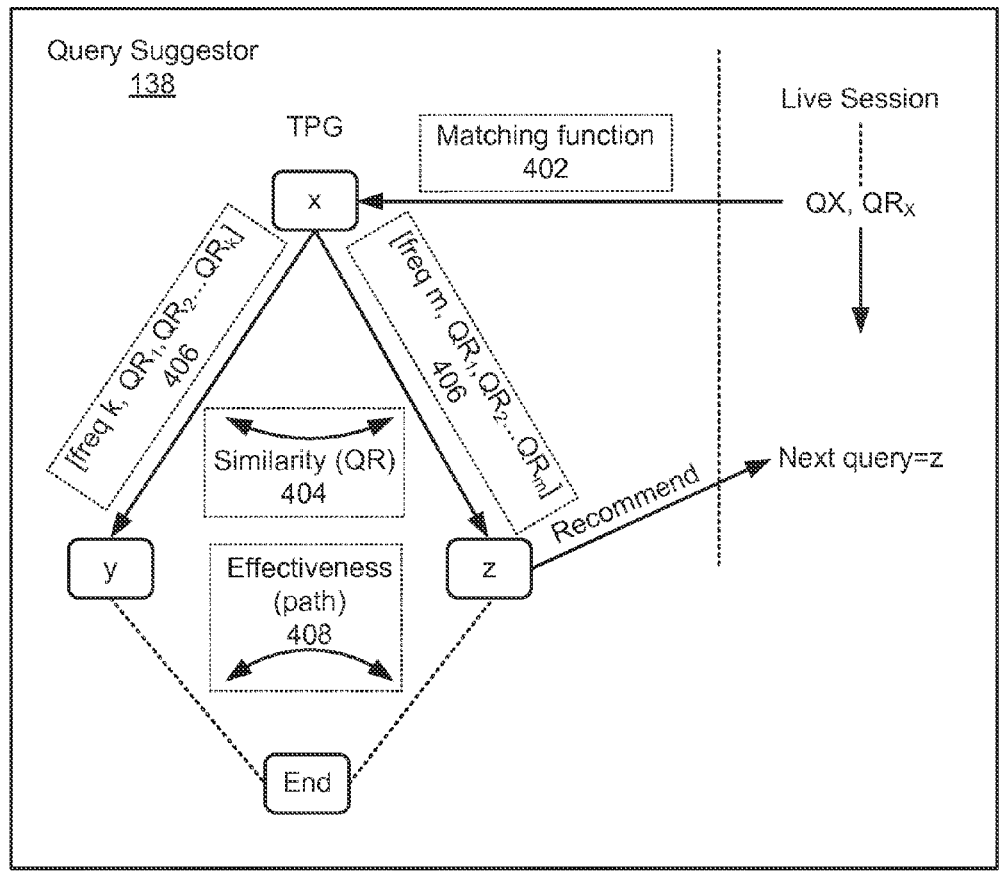
FIG. 4 illustrates example operations of a query suggestor of FIG. 1 according to an embodiment.

FIG. 4 illustrates example operations of the query suggestor 138 according to an embodiment. In one example, during a live troubleshooting session 121, a user may have executed a series of queries 122 and generated corresponding query results 124. At this stage, either the user explicitly seeks guidance on how to proceed, or the system 100 provides an unobtrusive hint or recommendation on the next query to try next (e.g., the proposed query 128).

Initially, the query suggestor 138 may receive the current query QX, and its query results $QR_X$ and determine which of the query nodes 166 (X,Y,Z) in the troubleshooting pattern graph 146 substantially match the current query QX based on a matching function 402. For example, the query suggestor 138 may determine where in the current troubleshooting pattern graph 146 matches the user's current session, e.g., what query node 166 in the troubleshooting pattern graph 146 corresponds to the user's latest query QX. For example, the matching function 402 may locate a query node 166 in the troubleshooting pattern graph 146 that matches a given input query QX by comparing a transformed version of the input query QX to the transformed content of the query nodes 166 in the troubleshooting pattern graph 146 that closely matches the transformed version of the input query QX. The matching function 402 may be based on the Query AST comparison described above. In the example of FIG. 4, the query suggestor 138 may determine that query node X substantially matches the input query QX.

In this context, at any stage if the user chooses not to follow the recommended/suggested next query, the same matching function 402 is used to search for a similar query node to the query that the user chooses to execute. As a result, ad-hoc jumps by user during the troubleshooting process are also taken into account.

Generally, the query suggestor 138 may compute scores for the query nodes stemming from the matched query, e.g., query node y and query node z. For example, the query suggestor 138 may calculate a score the query node y based on a similarity between the query result $QR_X$ of the current query QX and the query result(s) associated with the link x-y, the distance from the matched query node (query node x) to the end query (END), and the frequency k in which the link x-y was previously traversed. The frequency k may be indicated by the number of query results QR associated with the link x-y. Further, the query suggestor 138 may weight the similarity, the distance, and the frequency in order to compute the score for the query node y. The same process may be applied to the other query node (query node z) stemming from the query node x. Then, based on the calculated scores, the query suggestor 138 may rank the candidate query nodes y and z, and select one of these as the next query to be considered in the live troubleshooting session 121.

In further detail, the query suggestor 138 may examine all outgoing links from the similar query found by the matching function 402 (e.g., in this case, query node X). In the example of FIG. 4, the query suggestor 138 may examine the links 164 in the troubleshooting pattern graph 146 stemming from the query node X (e.g., X–Z and X–Y). As explained above, the link x→y may be annotated with a list of transformed query results that had previously been observed when users attempted query x and followed it up with the query y. Also, it is noted that the number of transformed query results may include the frequency with which the path x→y was followed. The frequency component may be a relative important determinant for proposing a recommendation. In the example above, the link is annotated with the frequency k, and k transformed query results $QR_1$, $QR_2$, ... $QR_k$. Similarly, the link x→z is annotated with its frequency m and the corresponding transformed query results QRs.

Next, the query suggestor 138 may perform a similarity analysis 404 in order to examine the query result $QR_x$ from in the live troubleshooting session 121 after executing the query QX. In one example, the query suggestor 138 may apply a bag-of-words similarity analysis as the similarity analysis 404 to compute the similarity between the query result $QR_x$ and all the query results QRs previously recorded in the troubleshooting pattern graph 146 on all outgoing links from the query node x.

In further detail, the query suggestor 138 may compute a numeric similarity score (e.g., 1-100) indicating a degree of similarity between 1) the query result $QR_X$ (which has been transformed in the same manner described above) for the current query within the live troubleshooting session 121 and 2) the transformed query results $QR_1$, $QR_2$ ... $QR_m$ associated with the link (x–z). Essentially, the similarity computation value may include a degree of similarity between these query results. Also, the query suggestor 138 may compute a numeric similarity score (e.g., 1-100) indicating a degree of similarity between 1) the query result $QR_X$ (which has been transformed in the same manner described above) for the current query within the live troubleshooting session 121 and 2) the transformed query results $QR_1$, $QR_2$ ... $QR_k$ associated with the link (x–y).

The bag-of-words similarity analysis may be a similarity computation process that applies to the bag-of-words representation of the query results $QR_X$ and the bag-of-words representation of the previously recorded query results associated with the query nodes 166. Then, the similarity between these two representations is computed using a vector space model according to techniques that are well known to one of ordinary skill in the art. However, other advanced techniques such as Latent Semantic Indexing (LSI) may be used as well.

Further, while computing the similarity score, the query suggestor 138 uses the metadata information 163 that was captured as part of the query results including key information such as number of results in each search, faceted info information (e.g., grouping/categorization of results based on what log/entry source they pertain to, etc.), as explained below.

The query suggestor 138 may apply a function 406 on each identified link. In one example, the function 406 may include a max function that determines the max similarity value for each link. For example, on each link (such as x→z), the query suggestor 138 may apply a max( ) function to the similarity values of previous query results QRs recorded on that link, to identify the best matching query result QR on that link. Optionally, the query suggestor 138 may apply a similarity threshold below which a link is considered irrelevant to the current troubleshoot session 121, and prune the irrelevant links.

Then, the query suggestor 138 may apply an effectiveness analysis 408 when comparing the links. For example, the frequency of each link may be weighted by its max similarity value and its distance (e.g., path length) to the end query (EQ node) in the troubleshooting pattern graph 146. The query suggestor 138 may rank-order the links by this composite weighted-frequency metric. In effect, the query suggestor 138 may not necessarily rely on the popularity of each link, but rather the popularity weighted with its relevance to the live troubleshooting session 121, as well as the length of a link to the end query EQ. The weighting is structured such that recommendations are biased towards shorter paths and more similar results.

In this example, based on the composite weighted-frequency metric, the query suggestor 138 may select one of the two query nodes (Y or Z). In this example, the query suggestor 138 selected the query node Z as the proposed query. As such, the query suggestor 138 may provide a proposed query (e.g., node X) in order for the user to consider in the next troubleshooting sequence. Accordingly, the query suggestor 138 may prompt the user with a single node (y or z) based on the weighted frequency—i.e., recommends the query associated with query node y or the query associated with query node z as the next query for the user to try. Alternatively, the query suggestor 138 may provide multiple (or all) the previously recorded queries (e.g., associated with query nodes y and z) ranked by their weighted frequencies.

In addition, whichever query the user executes next (e.g., query node y, query node z or some other query), this query (along with its query results) is supplied back into the query suggestor 138 to determine the next recommendation in the course of the live troubleshooting session 121. In addition, if the live troubleshooting session 121 terminates successfully, the entire troubleshooting session is subsequently supplied back to troubleshooting learning process, thus incrementally improving the troubleshooting pattern graph 146. For easy navigation within the troubleshooting pattern graph 146, the query suggestor 138 may provide various graph visualization techniques depicting the next possible steps with their recommended scores or the entire troubleshooting pattern graph 146 or a portion thereof.

Figure 5:
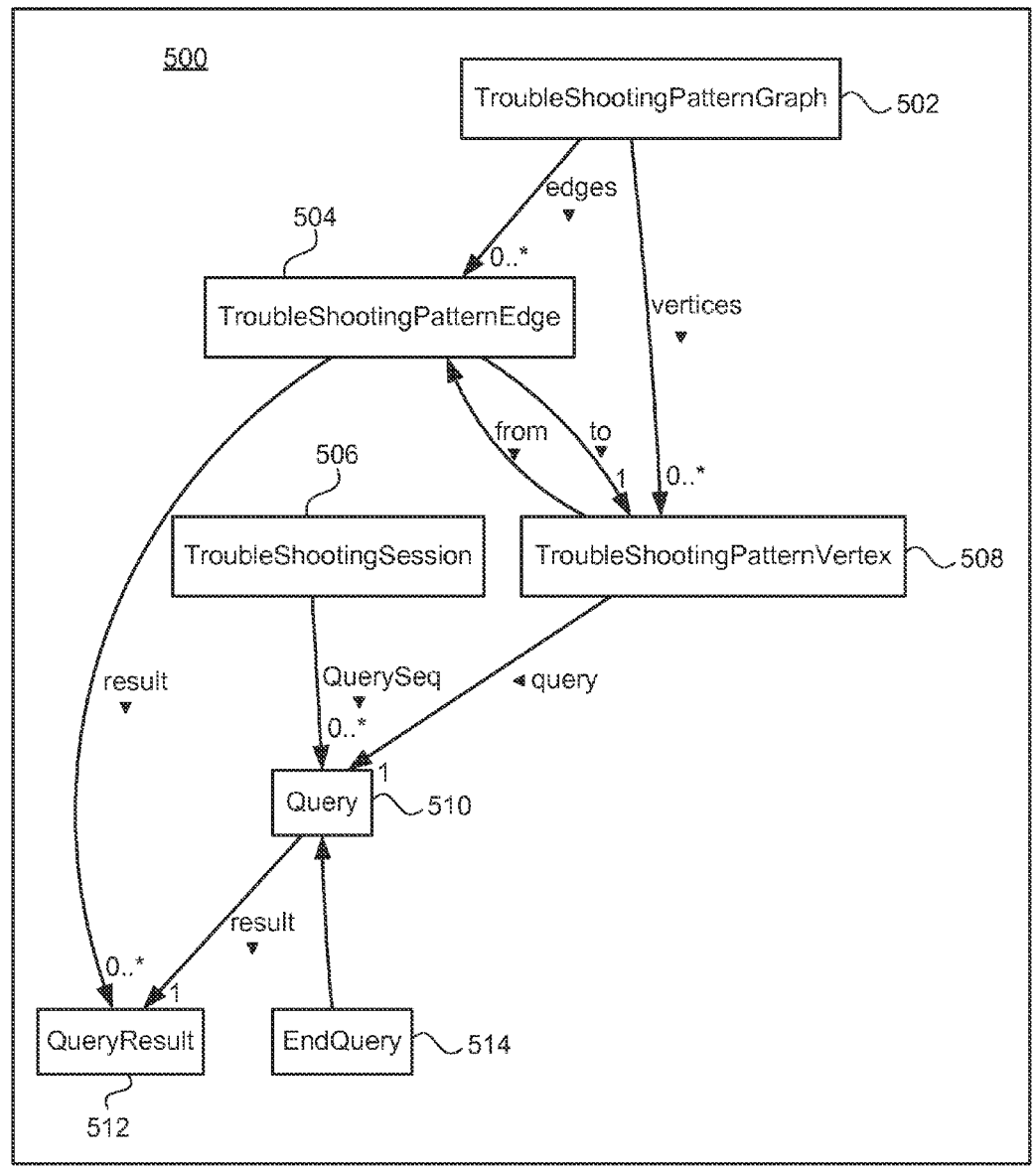
FIG. 5 illustrates a data model of the system of FIG. 1 according to an embodiment.

FIG. 5 illustrates a data model 500 of the system 100 of FIG. 1 according to an embodiment. The data model 500 may include a plurality of core classes such as a troubleshooting pattern graph 502, a troubleshooting pattern edge 504, a troubleshooting pattern vertex 508, a troubleshooting session 506, a query 510, a query result 512, and an end query 514.

The query 510 may be a specific trouble shooting search query that is executed as part of a sequence of queries executed in a troubleshooting session. The query 510 has a corresponding a query result 512 in the form of matching results (unstructured text) in the data store 182. The raw query is modified using a query templatizing function (TF) to bring it to a comparable form as described above. The query 510 may include attributes such as content and result. The content may be the text string processed by the templatizing function (TF). The result may be the string (the query result). In some embodiments, the query 510 may be the transformed query 142 of FIG. 1.

The end query 514 may be a placeholder query that signifies the end of a successful troubleshooting session, e.g., the ticket is marked resolved. In some embodiments, the end query 514 may be the end query node (EQ) of FIG. 3. The query result 512 may represent the result of a search query execution and may include of log lines/records matching the search query. In one example, the query result 512 may be transformed by normalizing the query result 512 to a bag-of-words form that makes it easier for comparison before the result is recorded. The query results 512 may include a plurality of attributes such as content (e.g., the string representing the entries of the data store 182 that have been transformed into the bag-of-words), and time representing the timestamp (e.g., the time when the corresponding query was executed and yielded this query result). In some embodiments, the query results 512 may be the transformed query results 144 of FIG. 1.

The troubleshooting session 506 may capture the details of a session in which the assigned user is attempting to resolve the issue (ticket). It records all the troubleshooting queries that the user has executed as part of that session. The session is marked resolved if the root cause of ticket is found and the ticket marked closed. The troubleshooting session 506 may include a plurality of attributes such as a ticket identifier (e.g., string of the issue ticket ID), a ticket description (e.g., string of issue ticket description), a query sequence providing the sequence of queries executed in this session, and resolved (e.g., Boolean indicating whether or not the corresponding issue has been resolved). In some embodiments, the troubleshooting session 506 may be the troubleshooting session 121 and/or the TS session information 185 of FIG. 1.

The troubleshooting pattern graph 502 may be a directed graph which captures historical troubleshooting pattern data for resolved tickets and is used for the recommendation of most relevant next troubleshooting step relative to the current query and query result that the user has executed in a live troubleshooting session. The troubleshooting pattern graph 502 may be periodically re-created by merging resolved troubleshooting sessions 506. The troubleshooting pattern graph 502 may include vertices (nodes) and edges (links). In some embodiments, the troubleshooting pattern graph 502 may be the troubleshooting pattern graph 146 of FIG. 1.

The troubleshooting pattern vertex 508 may be the node or vertex in the troubleshooting pattern graph that stores the transformed query. In some embodiments, the troubleshooting pattern vertex 508 may be the query nodes 166 of FIG. 1. The troubleshooting pattern vertex 508 may include a plurality of attributes such as a query (e.g., the transformed query). The troubleshooting pattern edge 504 may be a directed edge (link) in the troubleshooting pattern graph that defines traversal from a vertex or node (representing a troubleshooting query) to another vertex or node (representing another query) that would have been executed in a sequence in one or more of the captured troubleshooting sessions. The troubleshooting pattern edge 504 may include a plurality of attributes such as from (e.g., first vertex or node), to (second vertex or node), and results (e.g., the transformed query results of the first vertex or node). In some embodiments, the troubleshooting pattern edge 504 may be the links 164 of FIG. 1.

Figure 6:
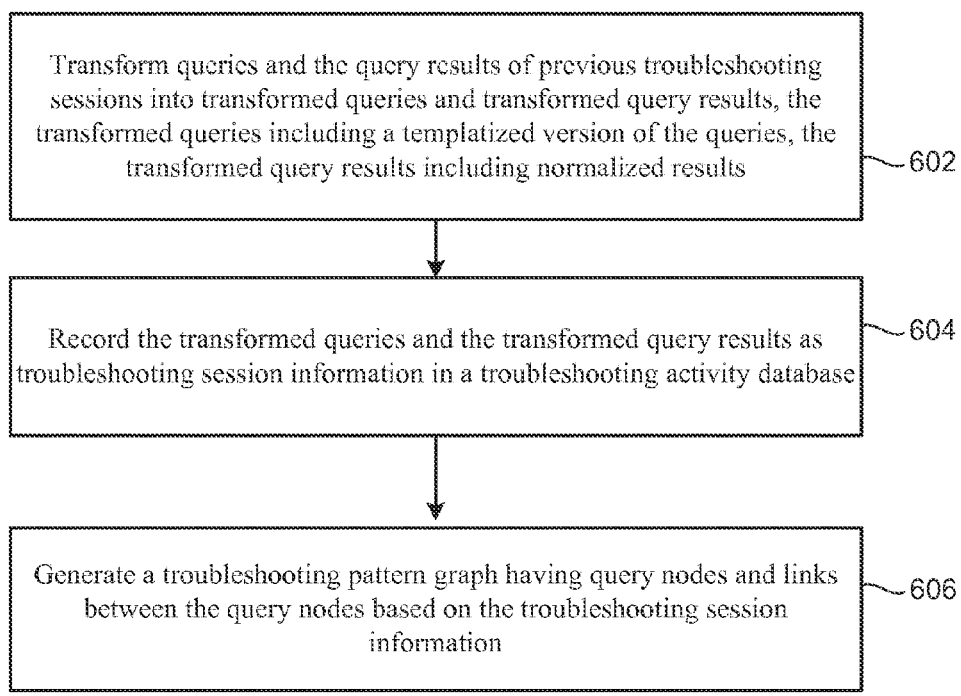
FIG. 6 is a flowchart illustrating example operations of the system of FIG. 1 according to an embodiment.

FIG. 6 is a flowchart illustrating example operations 600 of the system 100 of FIG. 1 according to an embodiment. Although FIG. 6 is illustrated as a sequential, ordered listing of operations 600, it will be appreciated that some or all of the operations 600 may occur in a different order, or in parallel, or iteratively, or may overlap in time.

Queries and query results of previous troubleshooting sessions may be transformed into transformed queries and transformed query results, where the transformed queries includes a templatized version of the queries, and the transformed query results includes normalized results (602).

For example, before recording the TS session information 185, the query transformer 134 may be configured to transform the queries 122 and the query results 124 of the troubleshooting sessions 121 into the transformed queries 142 and transformed query results 144.

With respect to the queries 122, the query transformer 134 may transform a query 122 to a templatized version that is a more general query than the one submitted by the user 190. For example, the query transformer 134 may be configured to convert the raw data of the query 122 submitted by the user 190 to a structured format such as the canonical query AST. In some examples, the query transformer 134 may be configured to record the time window of the query 122, replace host and other CI values of the query 122 with placeholder parameters, and replace timestamp values of the query 122 with a time window with placeholder parameters. In one example, the transformed query 142 may include placeholder parameters and the recorded time window in a formal structure.

With respect to query results 124, the query transformer 134 may transform a query result 124 to a templatized version that is a more general query result than the one returned to the user 190. For example, the query transformer 134 may transform the query result 124 (before recording it to the TS activity database 181) to a format that is compatible with a TS pattern learning unit 137 and/or a TS process guider 139.

In particular, the query transformer 134 may be configured to remove instance-specific data of the query result 124. For example, the query transformer 134 may be configured to remove timestamps, universal unique identifiers (UUIDs), machine, and internet protocol (IP) references etc. based on rules/regular expressions etc. Generally, the query transformer 134 may be configured to remove any markers in data that are not essential to the general troubleshooting process.

Also, the query transformer 134 may be configured to normalize the content of the query result 124 to a format that makes it easier to compare with other query results. In one example, the normalization may be based on a bag-of-words technique that produces an unordered collection of words, which may disregard grammar and even word order. Further, the transformed query result 144 may be associated with a timestamp (e.g., time when corresponding query was executed and yielded this result). However, the query transformer 134 may include metadata information 163 within the transformed query results 144 such as the number of results in each search, and faceted information (e.g., grouping/categorization of results based on what log/entry source they pertain to), etc. The metadata information 163 may be used in the similarity search to compute the similarity score, as further explained below.

Therefore, the transformed query results 144 may be the query results that were applied to the transformation function which removes the timestamp specific information from the entries of the data store 182 and converts the remaining text into the bag-of-words representation, as well as the relevant metadata information 163.

The transformed queries and the transformed query results may be recorded as troubleshooting session information in a troubleshooting activity database (604). For example, the TS activity recorder 135 may record the transformed queries 142 and the transformed query results 144 and the sequence in which they are performed within each completed troubleshooting session 121 as the TS session information 185 within the TS activity database 181.

A troubleshooting pattern graph having query nodes and links between the query nodes may be generated based on the troubleshooting session information (606). For example, the TS pattern learning unit 137 may include the graph builder 136 that may generate the troubleshooting pattern graph 146 based on the TS session information 185 stored within the TS activity database 181, and then subsequently update the troubleshooting pattern graph 146 as more troubleshooting sessions 121 are recorded in the TS activity database 181. The troubleshooting pattern graph 146 may include the query nodes 166 and the links 164 as explained with reference to FIG. 3.

Figure 7:
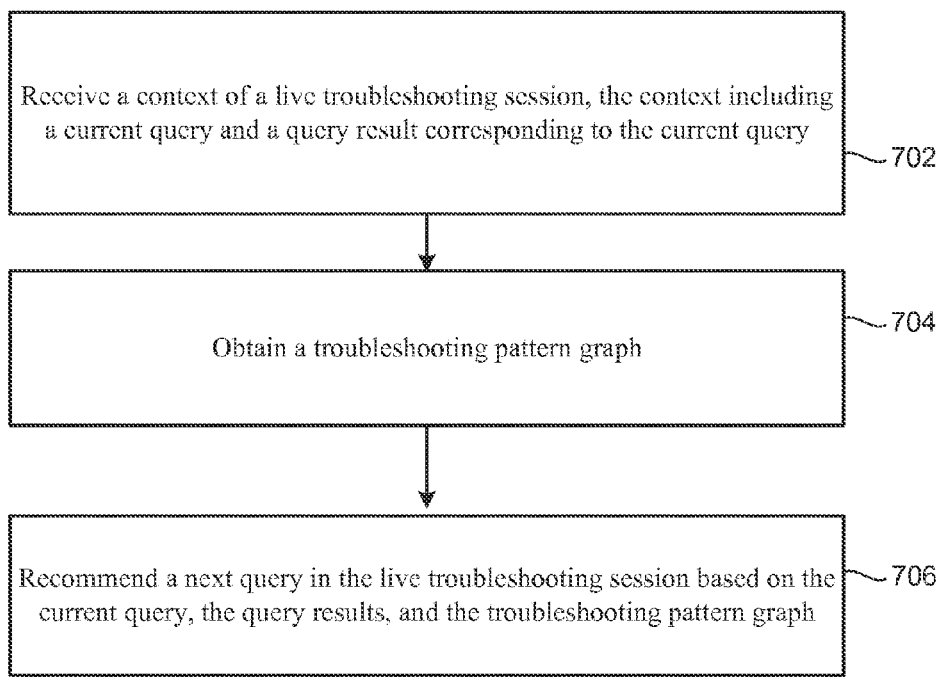
FIG. 7 is a flowchart illustrating example operations of the system of FIG. 1 according to an embodiment.

FIG. 7 is a flowchart illustrating example operations 700 of the system 100 of FIG. 1 according to an embodiment. Although FIG. 7 is illustrated as a sequential, ordered listing of operations 700, it will be appreciated that some or all of the operations 700 may occur in a different order, or in parallel, or iteratively, or may overlap in time. The operations 700 of FIG. 7 may be a continuation of FIG. 6 or may be separately implemented.

A context of a live troubleshooting session may be received, where the context includes a current query and a query result corresponding to the current query (702). For example, the query suggestor 138 may be configured to receive a current context of a live troubleshooting session 121. The current context may include a current query 122 and the corresponding query result 124.

A troubleshooting pattern graph may be obtained (704). For example, the query suggestor 138 may be configured to obtain the troubleshooting pattern graph 146 from the troubleshooting pattern graph database 180. In some examples, the query suggestor 138 may obtain the troubleshooting pattern graph 146 corresponding to the type of problem/ticket associated with the live troubleshooting session 121.

A new query in the live troubleshooting session may be recommended based on the current query, the query results, and the troubleshooting pattern graph (706). For example, the query suggestor 138 may be configured to recommend a new query (e.g., proposed query 128) based on the current query 122, the corresponding query result 124, and the obtained troubleshooting pattern graph 146. In some examples, this recommendation may be based on FIG. 4 as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a non-transitory computer-readable medium storing instructions, that when executed by the at least one processor, are configured to implement:
   a troubleshooting activity recorder configured to record troubleshooting sessions for troubleshooting issues within a network system, each troubleshooting session including a sequence of queries and results from searching on a data store that stores log entries for events occurring within the network system and configuration data of components of the network system,
wherein the troubleshooting activity recorder includes a query transformer configured to transform the queries and the results into transformed queries and transformed results, wherein the transformed queries and the transformed results have a structured format that is searchable;
a graph builder configured to automatically learn troubleshooting patterns based on the recorded troubleshooting sessions, the graph builder configured to automatically generate a troubleshooting pattern graph using the transformed queries and the transformed results,
wherein the graph builder is configured to automatically generate the troubleshooting pattern graph by creating a plurality of query nodes that represent the transformed queries, creating links between the nodes of the plurality of query nodes, and annotating the links using the transformed results;
a search engine configured to search the data store in response to a first query of a current troubleshooting session, and return a first result in response to the first query; and
a query suggestor configured to select one of the nodes of the plurality of query nodes in the troubleshooting pattern graph as a recommendation for a second query to be performed in the current troubleshooting session by searching and analyzing the plurality of query nodes and the annotated links in the troubleshooting pattern graph using the first query and the first result.

2. The system of claim 1, wherein, for each query, the query transformer is configured to replace a timestamp value with a time window, and to replace a confidence interval (CI) value with a placeholder parameter.

3. The system of claim 1, wherein, for each result, the query transformer is configured to remove instance-specific data, to create one or more searchable terms, and to associate with metadata to the result.

4. The system of claim 1, wherein a recorded troubleshooting session includes a first transformed result resulting from a first transformed query, and a second transformed query, the second transformed query having been performed after the first transformed query,
wherein the graph builder is configured to determine whether the first transformed query and the second transformed query match any of the plurality of query nodes in the troubleshooting pattern graph,
wherein the graph builder is configured to create a first query node representing the first transformed query when the first transformed query does not match any one of the plurality of query nodes, and to create a second query node representing the second transformed query when the second transformed query does not match any one of the plurality of query nodes,
wherein the graph builder is configured to create a link between the first query node and the second query node, and to annotate the link with the first transformed result.

5. The system of claim 1, wherein the graph builder is configured to annotate the links with frequencies in which the links were traversed, the frequencies indicating a number of times that the links have been followed.

6. The system of claim 1, wherein, as additional troubleshooting sessions are recorded, the graph builder is configured to automatically update the troubleshooting pattern graph using the transformed queries and the transformed results from the additional recorded troubleshooting sessions such that the troubleshooting pattern graph improves over time.

7. The system of claim 1,
wherein the query suggestor is configured to identify a query node from the troubleshooting pattern graph that substantially matches the first query of the current troubleshooting session,
wherein the query suggestor is configured to determine which of the plurality of query nodes to recommend as the second query based on:
a level of similarity between the first result and results of links associated with the identified query node,
distances from the identified query node to an end query node, and
frequencies in which the links associated with the identified query node were traversed, the frequencies indicating a number of times the links have been followed.

8. The system of claim 7, wherein the query suggestor is configured to calculate scores for at least some of the plurality of query nodes based on a weighting of the level of similarity, the distances, and the frequencies, and to select one of the plurality of query nodes as the recommendation for the second query to be performed based on the calculated scores.

9. The system of claim 8, wherein the query suggestor is configured to rank the query nodes based on the calculated scores, and to select a query node having the highest calculated score as the recommendation for the second query to be performed.

10. The system of claim 1, wherein the transformed results include normalized results.

11. The system of claim 1, wherein the query transformer is configured to transform and normalize content of the results based on a bag-of-words technique that produces an unordered collection of words.

12. A computer-implemented method for providing a guided troubleshooting session, the method comprising:
receiving a context of a current troubleshooting session for solving an issue within a network system, the context including a first query and a first result that resulted from searching on a data store using the first query, the data store storing log entries for events occurring within the network system and configuration data of components of the network system;
obtaining a troubleshooting pattern graph, the troubleshooting pattern graph having a plurality of query nodes and links between the nodes of the plurality of query nodes, the plurality of query nodes representing queries from previously recorded troubleshooting sessions, the links being annotated with results of the queries and frequencies in which the links were traversed, the frequencies indicating a number of times the links have been followed; and
selecting one of the plurality of query nodes in the troubleshooting pattern graph as a recommendation for a second query to be performed in the current troubleshooting session, wherein the selecting includes:
identifying a query node from the troubleshooting pattern graph that substantially matches the first query; and
selecting one of the plurality of query nodes from the troubleshooting pattern graph as the recommendation for the second query based on (i) a level of similarity between the first result and results of links associated with the identified query node, (ii) distances from the identified query node to an end query node, and (iii) the frequencies in which the links associated with the identified query node were traversed.

13. The computer-implemented method of claim 12, wherein the selecting further includes:
    calculating scores for at least some of the plurality of query nodes based on a weighting of the level of similarity, the distances, and the frequencies; and
    selecting a query node having the highest calculated score as the recommendation for the second query to be performed.

14. A non-transitory computer-readable medium storing instructions, when executed by at least one processor, are configured to:
    transform queries and results of previous troubleshooting sessions to transformed queries and transformed results, wherein the transformed queries and the transformed results have a structured format that is searchable, wherein the results include data resulting from searching on a data store that stores log entries for events occurring within the network system and configuration data of components of the network system;
    record the transformed queries and the transformed results as troubleshooting session information in a troubleshooting activity database;
    automatically generate a troubleshooting pattern graph using the transformed queries and the transformed results including:
        create a plurality of query nodes that represent the transformed queries, and links between the plurality of query nodes;
        annotate the links with the transformed results;
    search the data store in response to a first query of a current troubleshooting session, and return a first result in response to the first query; and
    select one of the nodes of the plurality of query nodes in the troubleshooting pattern graph as a recommendation for a second query to be performed in the current troubleshooting session including:
        identify a query node from the troubleshooting pattern graph that substantially matches the first query of the current troubleshooting session; and
        select one of the plurality of query nodes in the troubleshooting pattern graph as the recommendation for the second query to be performed based on a scoring algorithm inputted with (i) a level of similarity between the first result and results of links associated with the identified query node, (ii) distances from the identified query node to an end query node via the links associated with the identified query node, and (iii) frequencies in which the links associated with the identified query node were traversed.

15. The non-transitory computer-readable medium of claim 14, wherein the transformed queries and the transformed results include a first transformed result resulting from a first transformed query, and a second transformed query, the second transformed query having been performed after the first transformed query, wherein the instructions to generate automatically the troubleshooting pattern graph include instructions to:
    create a first query node corresponding to the first transformed query when the first transformed query does not match any one of the plurality of query nodes, and create a second query node corresponding to the second transformed query when the second transformed query does not match any one of the plurality of query nodes;
    create a link between the first query node and the second query node; and
    annotate the link with the first transformed result.

16. The non-transitory computer-readable medium of claim 14, wherein the instructions include instructions to:
    record secondary troubleshooting session information for additional troubleshooting sessions; and
    automatically update the troubleshooting pattern graph using the transformed queries and the transformed results from the additional troubleshooting sessions such that the troubleshooting pattern graph improves over time.

17. The non-transitory computer-readable medium of claim 14, wherein the structured format includes a canonical query Abstract Syntax Tree (AST).

18. The non-transitory computer-readable medium of claim 14, wherein the links are annotate with the frequencies in which the links were traversed, the frequencies indicating a number of times the links have been followed.

* * * * *